US010042060B2

(12) United States Patent
Hamano et al.

(10) Patent No.: US 10,042,060 B2
(45) Date of Patent: Aug. 7, 2018

(54) SCINTILLATOR PANEL, RADIOGRAPHIC IMAGE DETECTION DEVICE, AND METHOD FOR MANUFACTURING SAME

(71) Applicant: TORAY INDUSTRIES, INC., Tokyo (JP)

(72) Inventors: Tsubasa Hamano, Otsu (JP); Takahiro Tanino, Otsu (JP); Takuya Nishiyama, Otsu (JP); Izumi Tajima, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 38 days.

(21) Appl. No.: 15/314,707

(22) PCT Filed: May 22, 2015

(86) PCT No.: PCT/JP2015/064780
§ 371 (c)(1),
(2) Date: Nov. 29, 2016

(87) PCT Pub. No.: WO2015/182524
PCT Pub. Date: Dec. 3, 2015

(65) Prior Publication Data
US 2017/0192105 A1 Jul. 6, 2017

(30) Foreign Application Priority Data
May 30, 2014 (JP) .................. 2014-112067

(51) Int. Cl.
*G01T 1/20* (2006.01)
(52) U.S. Cl.
CPC ..................... *G01T 1/20* (2013.01)

(58) Field of Classification Search
CPC ............................. G01T 1/2002; G01T 1/202
See application file for complete search history.

(56) References Cited

U.S. PATENT DOCUMENTS 4,208,470 A * 6/1980 Rabatin ............... C09K 11/777
428/328
4,769,549 A 9/1988 Tsuchino et al.
(Continued)

FOREIGN PATENT DOCUMENTS

| JP | 0560871 | 3/1993 |
| JP | 09325185 | 12/1997 |

(Continued)

OTHER PUBLICATIONS

Extended European Search Report for European Application No. 15799767.7, dated Jan. 17, 2018, 7 pages.

(Continued)

*Primary Examiner* — Kiho Kim
(74) *Attorney, Agent, or Firm* — RatnerPrestia

(57) ABSTRACT

The present invention provides a highly reliable scintillator panel capable of attaining an image having excellent clarity by markedly suppressing scattering of light emitted from a phosphor by a simple method to give emitted light having a necessary and sufficient intensity. Provided is a scintillator panel including a substrate and a phosphor layer containing a phosphor powder, wherein the phosphor layer has a plurality of recesses in a surface thereof, an area A of openings of the recesses is 500 to 70000 $\mu m^2$, and a ratio D/T of a depth D of the recesses to a thickness T of the phosphor layer is 0.1 to 0.9.

7 Claims, 5 Drawing Sheets

(56) References Cited

U.S. PATENT DOCUMENTS

| | | | |
|---|---|---|---|
| 5,219,606 A * | 6/1993 | Homma | G05B 19/0425 427/226 |
| 6,676,854 B2 | 1/2004 | Shimizu | |
| 8,884,232 B2 | 11/2014 | Kaneko | |
| 9,029,749 B2 | 5/2015 | Unagami | |
| 9,316,750 B2 | 4/2016 | Hosoi | |
| 2002/0191743 A1 | 12/2002 | Sklebitz | |
| 2008/0023649 A1 | 1/2008 | Kubota et al. | |
| 2011/0303873 A1 | 12/2011 | Fukuta et al. | |
| 2015/0241569 A1 | 8/2015 | Okamura | |

FOREIGN PATENT DOCUMENTS

| | | |
|---|---|---|
| JP | 2002122672 | 4/2002 |
| JP | 2002333480 | 11/2002 |
| JP | 2003082347 | 3/2003 |
| JP | 2003215253 | 7/2003 |
| JP | 2011007552 | 1/2011 |
| JP | 2011188148 | 9/2011 |
| JP | 2012058170 | 3/2012 |
| JP | 2012242355 | 12/2012 |
| JP | 2013117547 | 6/2013 |
| JP | 5488773 | 5/2014 |
| WO | 0012649 A1 | 3/2000 |
| WO | 2010010725 | 1/2010 |
| WO | 2013136873 | 9/2013 |

OTHER PUBLICATIONS

International Search Report and Written Opinion for International Application No. PCT/JP2015/064780, dated Jul. 7, 2015, 6 pages.

* cited by examiner

SCINTILLATOR PANEL, RADIOGRAPHIC IMAGE DETECTION DEVICE, AND METHOD FOR MANUFACTURING SAME

CROSS REFERENCE TO RELATED APPLICATIONS

This is the U.S. National Phase application of PCT International Application No. PCT/JP2015/064780, filed May 22, 2015, and claims priority to Japanese Patent Application No. 2014-112067, filed May 30, 2014, the disclosures of each of these applications being incorporated herein by reference in their entireties for all purposes.

FIELD OF THE INVENTION

The present invention relates to a scintillator panel, a radiographic image detection device, and a method for manufacturing the radiographic image detection device.

BACKGROUND OF THE INVENTION

Radiographic images captured using films have been widely used heretofore in medical settings. However, since a radiographic image captured using a film provides analog image information, in recent years, digital radiographic image detectors such as computed radiography (CR) and flat panel radiation detectors (flat panel detector: FPD) have been developed.

The FPDs include a direct system FPD and an indirect system FPD. In the indirect system FPD, a scintillator panel is used for converting a radiation into visible light. The scintillator panel includes, as a constituent element, a phosphor layer containing a phosphor such as cesium iodide (CsI) or gadolinium oxysulfide (GOS). The phosphor emits visible light in response to an applied radiation, and the emitted light is converted into electric signals by a TFT or a CCD. In this way, radiographic information is converted into digital image information.

As a method of forming a phosphor layer, a method in which a coating film of a paste-like phosphor powder is used as a phosphor layer is simple; however, the light emitted from a phosphor is scattered within the coating film, and image clarity is extremely low. Therefore, in order to utilize light emitted from a phosphor with high efficiency by suppressing scattering of the emitted light, there are proposed, for example, a method of alternately arranging a phosphor layer formed of a phosphor of a large particle diameter and a phosphor layer formed of a phosphor of a small particle diameter (Patent Document 1), a method of disposing a barrier rib for dividing the phosphor layer (Patent Documents 2 to 4), and a method of improving an S/N ratio by forming a phosphor having a columnar crystal structure such as CsI by means of vapor deposition and guiding the light emitted from a phosphor to a TFT or a CCD (Patent Documents 5 to 6).

PATENT DOCUMENTS

Patent Document 1: Japanese Patent Laid-open Publication No. 2003-215253
Patent Document 2: Japanese Patent Laid-open Publication No. 5-60871
Patent Document 3: Japanese Patent Laid-open Publication No. 2011-188148
Patent Document 4: Japanese Patent Laid-open Publication No. 2011-007552
Patent Document 5: Japanese Patent Laid-open Publication No. 2012-242355
Patent Document 6: Japanese Patent Laid-open Publication No. 2013-117547

SUMMARY OF THE INVENTION

However, in the method of alternately disposing layers of phosphors having different particle diameters and the method of disposing a barrier rib, scattering of light emitted from a phosphor cannot be adequately suppressed, and emitted light having a necessary intensity is not obtained at present. Further, in a method in which CsI or the like having a columnar crystal structure is used as a phosphor layer, it is considered as a problem that chemical stability of the columnar crystal structure is low and degradation of the panel image quality due to mixing of a foreign matter easily occurs.

Thus, the present invention provides a highly reliable scintillator panel capable of attaining an image having excellent clarity by markedly suppressing scattering of light emitted from a phosphor by a simple method to give emitted light having a necessary and sufficient intensity.

The above-mentioned problems are solved by any one of the following technical means.

A scintillator panel including a substrate and a phosphor layer containing a phosphor powder, wherein the phosphor layer has a plurality of recesses in a surface thereof, an area A of openings of the recesses is 500 to 70000 $\mu m^2$, and a ratio D/T of a depth D of the recesses to a thickness T of the phosphor layer is 0.1 to 0.9.

A radiographic image detection device including the scintillator panel.

A method for manufacturing a radiographic image detection device including the scintillator panel and a detection substrate including a photoelectric conversion element opposed to the recesses of the scintillator panel, the method including (A) a step of aligning the recesses with the photoelectric conversion element, and (B) a step of bonding the scintillator panel to the detection substrate.

According to the present invention, it is possible to provide a highly reliable scintillator panel capable of realizing an image having extremely high clarity by markedly suppressing scattering of light emitted from a phosphor by a simple method to secure emitted light having a necessary and sufficient intensity.

DETAILED DESCRIPTION OF EMBODIMENTS OF THE INVENTION

A scintillator panel of an embodiment of the present invention includes a substrate and a phosphor layer containing a phosphor powder, wherein the phosphor layer has a plurality of recesses in a surface thereof, an area A of openings of the recesses is 500 to 70000 $\mu m^2$, and a ratio D/T of a depth D of the recesses to a thickness T of the phosphor layer is 0.1 to 0.9.

A specific configuration of the scintillator panel of an embodiment of the present invention will be described below with reference to drawings; however, the present invention is not limited thereto.

Figure 1:
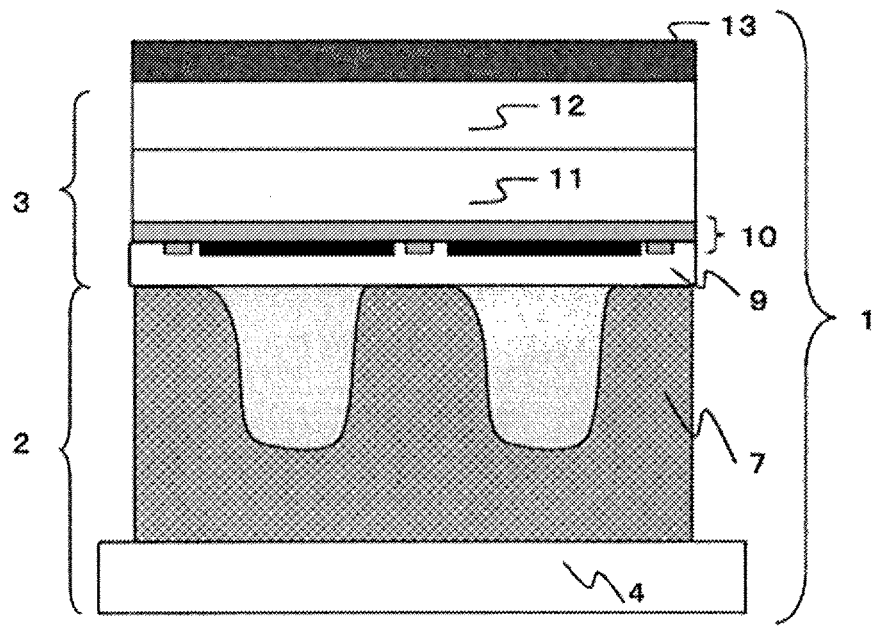
FIG. 1 shows a sectional view schematically showing a configuration of a radiographic image detection device including a scintillator panel according to an aspect of the present invention.
Figure 2:
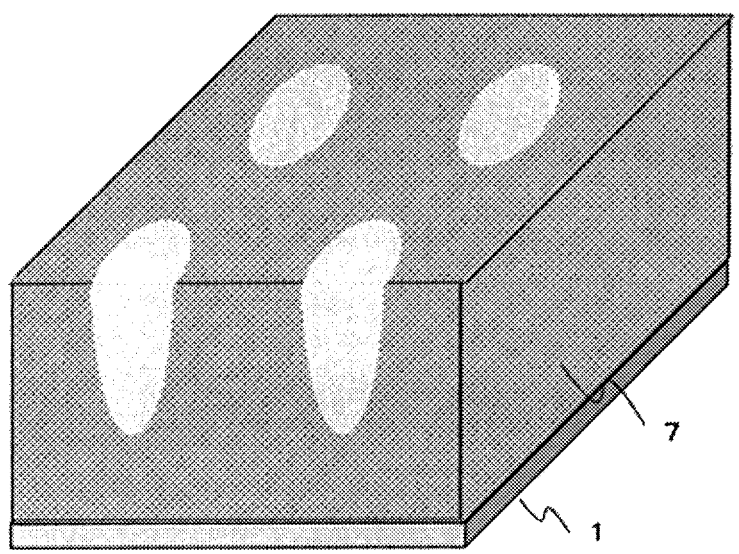
FIG. 2 shows a perspective view schematically showing a configuration of a scintillator panel according to an aspect of the present invention.
Figure 3:
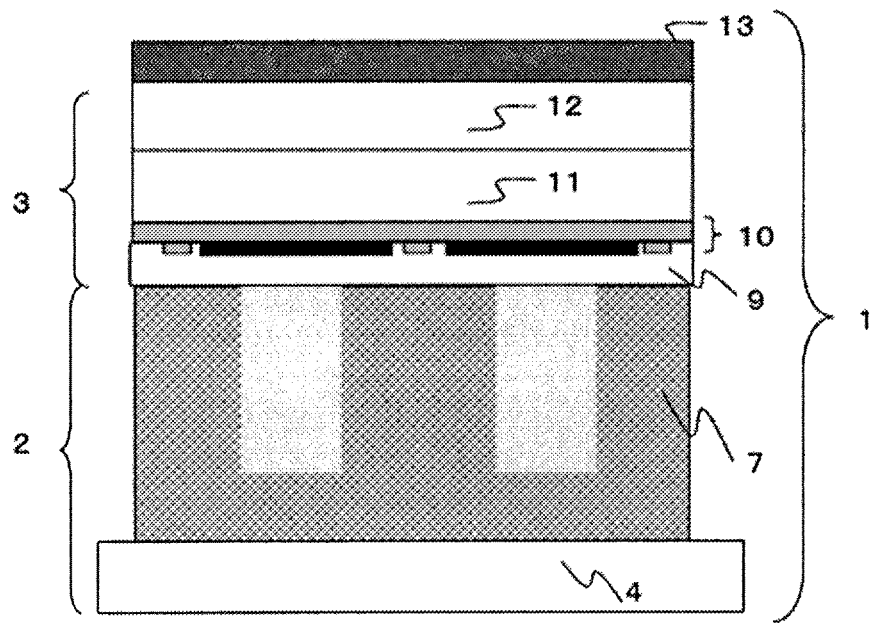
FIG. 3 shows a sectional view schematically showing a configuration of a radiographic image detection device including a scintillator panel according to an aspect of the present invention.
Figure 4:
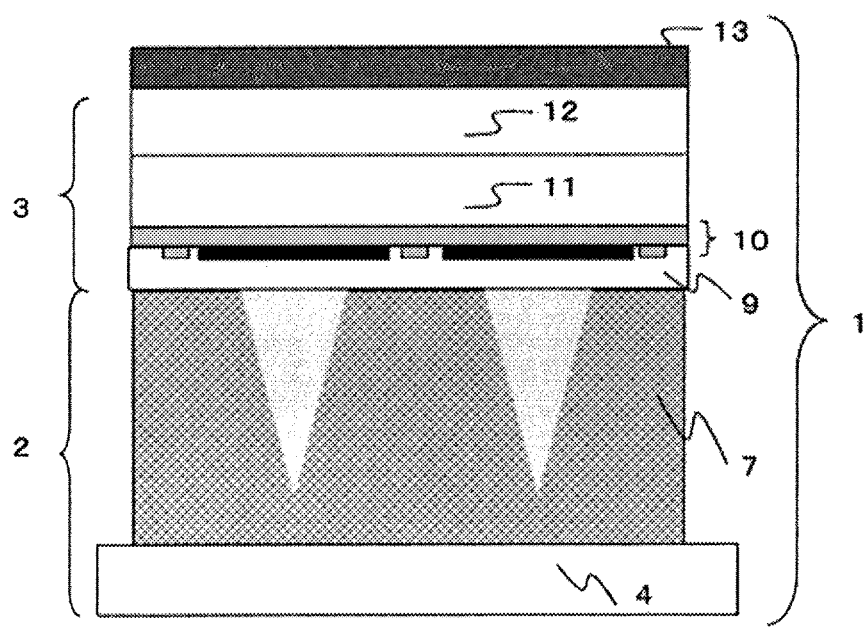
FIG. 4 shows a sectional view schematically showing a configuration of a radiographic image detection device including a scintillator panel according to an aspect of the present invention.
Figure 5:
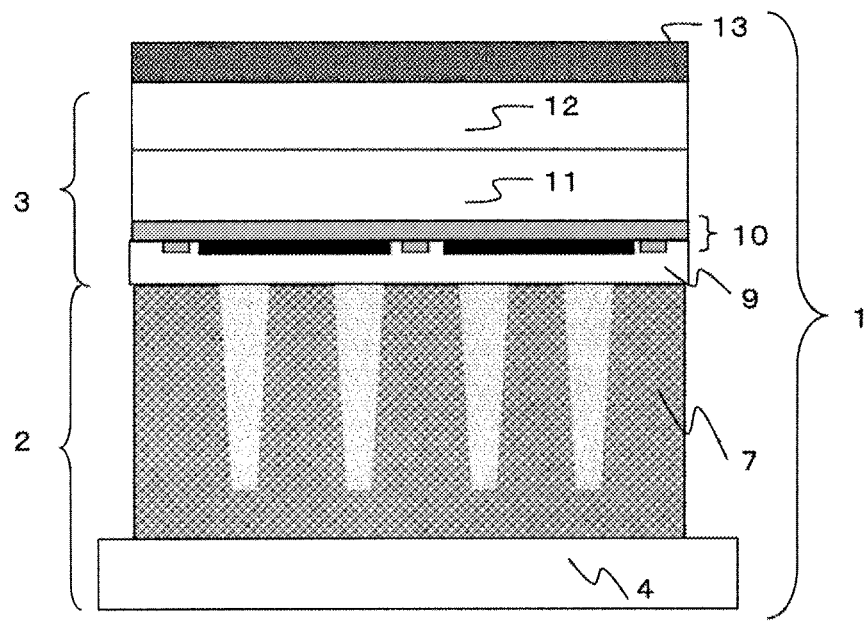
FIG. 5 shows a sectional view schematically showing a configuration of a radiographic image detection device including a scintillator panel according to an aspect of the present invention.

FIGS. 1, 3 to 5 and 7 each show a sectional view schematically showing a configuration of a radiographic image detection device including a scintillator panel of an embodiment of the present invention. FIGS. 2 and 8 are each a perspective view schematically showing a configuration of the scintillator panel of an embodiment of the present invention. A radiographic image detection device 1 includes a scintillator panel 2, a detection substrate 3 and a power source part 13.

The scintillator panel 2 includes a substrate 4, and a phosphor layer 7 formed on the substrate 4 and containing a phosphor powder. The phosphor layer 7 has a plurality of recesses in a surface thereof.

The detection substrate 3 has a substrate 12, a photoelectric conversion layer 10 in which pixels composed of a photoelectric conversion element and a TFT are two-dimensionally formed, and an output layer 11 on the substrate 12. The light exit surface of the scintillator panel 2 and the photoelectric conversion layer 10 of the detection substrate 3 are bonded or adhered to each other with an adhesion layer 9 interposed therebetween, and thereby, the radiographic image detection device 1 is configured. In this case, the pixel of the photoelectric conversion element is adapted so as to correspond to one or more recesses in the phosphor layer surface. One recess may correspond to one pixel, or two or more recesses may correspond to one pixel. It is preferred that the number of recesses of the phosphor layer corresponding to one pixel of the photoelectric conversion element is uniform.

The radiation entering the radiographic image detection device 1 is absorbed by the phosphor contained in the phosphor layer 7 to emit visible light. Light emitted from the phosphor in this way is hereinafter referred to as "light emitted from a phosphor." The light emitted from a phosphor having reached the photoelectric conversion layer 10 is photoelectrically converted in the photoelectric conversion layer 10, and output as electrical signals through the output layer 11.

Examples of the material of the substrate to be used for the scintillator panel include glass, ceramics, semiconductors, polymer compounds, and metals which are permeable to radiation. Examples of the glass include quartz, borosilicate glass and chemically strengthened glass. Examples of the ceramics include sapphire, silicon nitride, and silicon carbide. Examples of the semiconductors include silicon, germanium, gallium arsenide, gallium phosphide and gallium nitrogen. Examples of the polymer compounds include cellulose acetate, polyester, polyamide, polyimide, triacetate, polycarbonate and carbon fiber reinforced resin. Examples of the metals include aluminum, iron, copper and metal oxides.

In addition, since weight reduction of the scintillator panel is pursued in point of convenience of carrying of the scintillator panel, the thickness of the substrate is preferably 2.0 mm or less, and more preferably 1.0 mm or less. Further, in order to utilize the light emitted from a phosphor with high efficiency, a substrate having a high reflectance is preferred. Examples of a preferred material of the substrate include glass and a polymer compound. Particularly preferred examples thereof include a highly reflecting polyester substrate. As the highly reflecting polyester substrate, a white polyester substrate containing voids is more preferred since it has high permeability of a radiation and a low specific gravity.

The phosphor layer is formed on the substrate. The phosphor layer contains a phosphor powder. Herein, the phosphor powder refers to a phosphor having an average particle diameter D50 of 40 μm or less. Examples of the phosphor include CsI, CsBr, $Gd_2O_2S$ (hereinafter, "GOS"), $Gd_2SiO_5$, $BiGe_3O_{12}$, $CaWO_4$, $Lu_2O_2S$, $Y_2O_2S$, $LaCl_3$, $LaBr_3$, $LaI_3$, $CeBr_3$, $CeI_3$ and $LuSiO_5$. For enhancing luminance efficiency, an activator may be added to the phosphor. Examples of the activator include sodium (Na), indium (In), thallium (Tl), lithium (Li), potassium (K), rubidium (Rb), sodium (Na), terbium (Tb), cerium (Ce), europium (Eu) and praseodymium (Pr). Tb-activated GOS (GOS:Tb) obtained by adding Tb to GOS is preferred since it has high chemical stability and high luminance efficiency.

The phosphor powder is preferably spherical, flat or rod-like. The average particle diameter D50 of the phosphor is preferably 0.1 to 40 μm, more preferably 1.0 to 25 μm, and further preferably 1.0 to 20 μm. On the other hand, when the D50 is less than 0.1 μm, there may be cases where sufficient light emission is not attained due to surface defects of a phosphor. Further, when the D50 is more than 40 μm, there may be cases where a variation in detection intensity among photoelectric conversion elements is large, and clear images are not attained.

The average particle diameter D50 of the phosphor powder can be measured after charging the phosphor powder into a sample chamber filled with water using a particle size distribution analyzer (for example, MT 3300; manufactured by NIKKISO Co., Ltd.), and subjecting the powder to an ultrasonic treatment for 300 seconds.

The phosphor layer has a plurality of recesses in a surface thereof. Herein, the surface of the phosphor layer refers to a surface positioned opposite to the substrate in the phosphor layer. Since recesses of the phosphor layer enable the phosphor layer to gather light emitted from a phosphor in the recesses and suppress scattering of emitted light, clearer images can be obtained. Further, when the phosphor layer has recesses, light absorption by a phosphor before the light emitted from a phosphor reaches the photoelectric conversion layer is reduced, and therefore the emitted light can be utilized with high efficiency.

Examples of the shape of the recess of the phosphor layer include shapes shown in FIG. 1 and FIGS. 3 to 5.

The area A of openings of the recesses of the phosphor layer needs to be 500 to 70000 μm². When the area A is less than 500 μm², the light emitted from a phosphor cannot be gathered in the recesses and scattering of emitted light cannot be suppressed. On the other hand, when the area A is more than 70000 μm², since the recess is larger than a pixel size of the photoelectric conversion element, an amount of light detected for each pixel varies among pixels, and therefore clear images are not obtained.

The area A can be determined by analyzing the image obtained by scanning the phosphor layer from an upside in a direction perpendicular to the substrate at a magnification of 20 times using a laser microscope (e.g., VK-9500; manufactured by KEYENCE Corporation). More specifically, the area A can be determined by randomly selecting five recesses in the scanned image, measuring a length which is mathematically required for determining an area according to the shape of each opening (e.g., the diameter of a circle when the shape of the opening is a precise circle; a length of a side when the shape of the opening is a square), determining the area of each opening, and calculating the average value of five areas.

Figure 6:
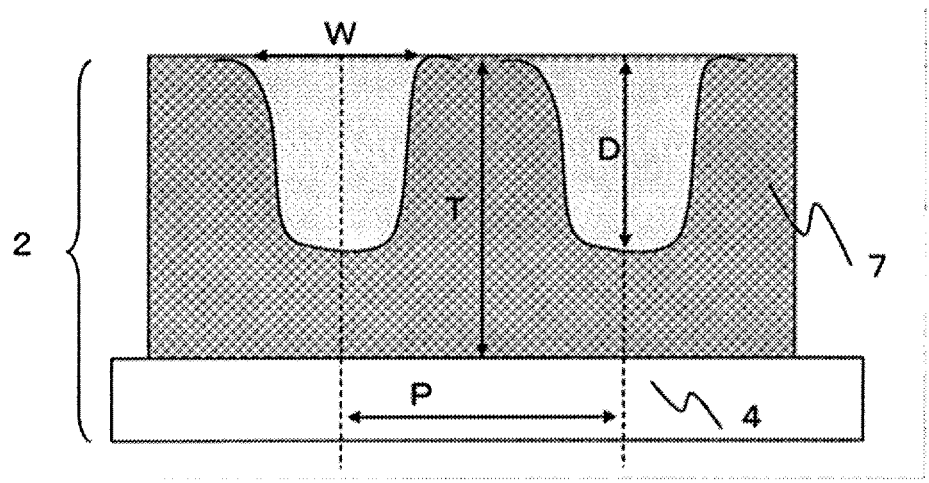
FIG. 6 shows a sectional view schematically showing a configuration of a scintillator panel according to an aspect of the present invention.

A sectional view schematically showing a scintillator panel according to an aspect of the present invention is shown in FIG. 6. In the scintillator panel 2, the phosphor layer 7 having a thickness T is formed on the substrate 4. The phosphor layer 7 has a plurality of recesses in a surface thereof. A maximum width of the openings of the recesses is denoted by W and a depth is denoted by D. Further, a distance between the recesses adjacent to each other is taken as a pitch P. Herein, the distance between the recesses adjacent to each other refers to the distance from the center point of an opening of a recess to the center point of an opening of a neighboring recess.

The maximum width W of the openings of the recesses is preferably 30 to 300 μm, more preferably 40 to 250 μm, and further preferably 40 to 150 μm. When the maximum width W of the openings is less than 30 μm, there may be cases where the light emitted from a phosphor cannot be gathered in the recesses, and clear images cannot be obtained by suppressing scattering of emitted light. On the other hand, when the maximum width W of the openings is more than 300 μm, since an amount of light detected for each pixel of the photoelectric conversion element varies among pixels, there may be cases where clear images are not obtained.

The maximum width W of the openings of the recesses can be determined by analyzing the image obtained by scanning the phosphor layer from an upside in a direction perpendicular to the substrate at a magnification of 20 times using a laser microscope (e.g., VK-9500; manufactured by KEYENCE Corporation). More specifically, the maximum width W can be determined by randomly selecting five recesses in the scanned image, and calculating the average value of five recesses with respect to a length mathematically required according to the shape of each opening (e.g., the diameter of a circle when the shape of the opening is a precise circle; and the length of a diagonal line of a square when the shape of the opening is a square).

The thickness T of the phosphor layer is preferably 120 to 1000 μm, more preferably 120 to 500 μm, and further preferably 120 to 350 μm. When the thickness T of the phosphor layer is less than 120 μm, there may be cases where the radiation cannot be adequately converted into visible light and emitted light having a necessary intensity is not obtained. On the other hand, when the thickness T of the phosphor is more than 1000 μm, there may be cases where the emitted light having a high intensity from a phosphor existing on a side of an irradiation direction of a radiation, which is irradiated with a radiation first, does not reach the photoelectric conversion layer, and the emitted light cannot be utilized with high efficiency. Moreover, this case requires a large amount of a phosphor powder, and cost of the scintillator panel increases.

The thickness T of the phosphor layer can be measured by the following method. First, the phosphor layer is cut in a direction perpendicular to the substrate at a position not having a recess and randomly selected. Five measurement points are randomly selected in the image obtained by observing the resulting cross section at a magnification of 20 times using an optical microscope (e.g., OPTISHOT; manufactured by NIKON CORPORATION), and the height of the phosphor layer at each measurement point is measured. This operation is repeated five times, and the average value of all (5×5) the values of measured height is regarded as the thickness T of the phosphor layer.

The depth D of the recess of the phosphor layer can be determined by analyzing the image obtained by scanning the phosphor layer from an upside in a direction perpendicular to the substrate at a magnification of 20 times using a laser microscope (e.g., VK-9500; manufactured by KEYENCE Corporation). More specifically, the depth D of the recess can be determined by randomly selecting five recesses in the scanned image, and calculating the average value of distances from each opening to the deepest part in a direction perpendicular to the substrate.

The ratio D/T of a depth D of the recesses of the phosphor layer to a thickness T of the phosphor layer needs to be 0.1 to 0.9, and the ratio D/T is preferably 0.2 to 0.8. When the D/T is less than 0.1, the radiation cannot be adequately converted into visible light and emitted light having a necessary intensity is not obtained. Further, the light emitted from a phosphor gathered in the recess leaks to a substrate side and does not reach the photoelectric conversion layer, resulting in a reduction of utilization efficiency of the emitted light. On the other hand, when the D/T is more than 0.9, the light emitted from a phosphor cannot be gathered in the recesses, and clear images cannot be obtained by suppressing scattering of emitted light.

The phosphor layer preferably has 500 to 50000 recesses/cm², and more preferably has 1200 to 15000 recesses/cm² on the surface thereof. When the number of recesses is less than 500 recesses/cm², there may be cases where a variation in the number of recesses of the phosphor layer corresponding to one pixel of the photoelectric conversion element is large, and clear images cannot be obtained. On the other hand, when the number of recesses is more than 50000 recesses/cm², there may be cases where the light emitted from a phosphor cannot be gathered in the recesses, and further the emitted light having a necessary intensity is not obtained since an amount of the phosphor powder is reduced.

The number of the recesses of the phosphor layer can be determined by analyzing the image obtained by scanning the phosphor layer from an upside in a direction perpendicular to the substrate at a magnification of 20 times using an optical microscope (e.g., OPTISHOT; manufactured by NIKON CORPORATION). More specifically, the number of recesses can be determined by measuring the number of recesses in each of 10 regions each having an area of 1 mm² randomly selected in the scanned image, and converting the average value of 10 measurements to a value per 1 cm$^2$.

The pitch P between the recesses adjacent to each other may be appropriately varied according to the pitch of the corresponding photoelectric conversion element, and the pitch is preferably in the range of 50 to 350 μm, and more preferably in the range of 50 to 280 μm. Further, the pitch P between the recesses adjacent to each other is preferably a constant value in the above-mentioned range. That is, it is preferred that the recesses of the phosphor layer are arranged at a constant interval in the range of 50 to 350 μm in order to make the number of recesses corresponding to one pixel of the photoelectric conversion element uniform. When the pitch P is less than 50 μm, there may be cases where the light emitted from a phosphor cannot be gathered in the recesses. On the other hand, when the pitch P is more than 350 μm, it may be difficult to make one or more recesses correspond to one pixel of the photoelectric conversion element. The pitch P is more preferably a constant value in the range of 50 to 280 μm.

The pitch P between the recesses adjacent to each other can be determined by analyzing the image obtained by scanning the phosphor layer from an upside in a direction perpendicular to the substrate at a magnification of 20 times using a laser microscope (e.g., VK-9500; manufactured by KEYENCE Corporation). More specifically, the distance from the center point of the opening of the recess to the center point of an opening of a neighboring recess is measured at randomly selected 10 points in the scanned image, and an average value is calculated and regarded as a pitch P of recesses.

The shape of the recess of the phosphor layer is preferably such a shape that the area of a cross section of the recess in a direction lateral to a substrate is the largest at the opening, and the area in the lateral direction does not change even when the depth D of the recess increases, or such a shape that the area in the lateral direction is decreased as the depth D increases. The shape of the recess of the phosphor layer is preferably an approximately conical shape having an opening as a bottom. Herein, the term "approximately" of the approximately conical shape means that the shape of the recess does not have to be conical in a strict sense, and the bottom (shape of the opening of the recess) may be elliptic or an apex (shape of the deepest part of the recess) may be rounded as shown in FIG. 2. Since the recess has such a shape, the emitted light gathered in the recess can be utilized with high efficiency without being confined within the recess.

Examples of a method of forming the phosphor layer on the substrate include a method in which a paste containing a phosphor powder, that is, a phosphor paste is applied onto a substrate and formed into a coating film. By forming recesses in the coating film of the phosphor paste thus obtained, a phosphor layer having a plurality of recesses in a surface thereof can be prepared: Examples of a method of applying a phosphor paste for preparing a coating film include a screen printing method, a bar coater method, a roll coater method, a die coater method and a blade coater method.

The phosphor paste may contain an organic binder. Examples of the organic binder include polyvinyl butyral, polyvinyl acetate, polyvinyl alcohol, ethyl cellulose, methyl cellulose, polyethylene, silicon resins such as polymethylsiloxane and polymethylphenylsiloxane, polystyrene, butadiene-styrene copolymers, polystyrene, polyvinylpyrrolidone, polyamide, high molecular weight polyethers, ethylene oxide-propylene oxide copolymers, polyacrylamide, and acrylic resins.

The phosphor paste may contain an organic solvent. When the phosphor paste contains an organic binder, it is preferred that the organic solvent is a good solvent for the organic binder and has high hydrogen bonding strength. Examples of such an organic solvent include diethylene glycol monobutyl ether acetate, ethylene glycol monobutyl ether alcohol, diethylene glycol monobutyl ether, methyl ethyl ketone, cyclohexanone, isobutyl alcohol, isopropyl alcohol, terpineol, benzyl alcohol, tetrahydrofuran, dimethyl sulfoxide, dihydroterpineol, γ-butyrolactone, dihydroterpinyl acetate, 3-methoxy-3-methyl-methylbutanol, propyleneglycol monomethyl ether, propyleneglycol monomethyl ether acetate, N,N-dimethylformamide, hexylene glycol and bromobenzoic acid.

The phosphor paste may contain a thickener, a plasticizer or a precipitation preventive agent in order to adjust the viscosity of the paste.

Examples of a method of forming recesses in the coating film of the phosphor paste include an etching method, a mold pressing method, a sandblasting method, and a photosensitive paste method. Particularly, a method of pressing, in a phosphor paste coating film, a mold on which a protruding pattern corresponding to a recess is formed using a press is preferred since the number of process steps is small, selectivity of the material of a phosphor paste is high, and it is possible to prevent impurities from being mixed into the phosphor paste coating film after forming recesses. The material of the mold may be a metal, ceramics or a resin; however, a transparent or white ceramics is preferred. Further, since the protruding pattern formed on the mold corresponds to recesses as described above, the protruding pattern is formed in conformity with the shape and pitch of intended recesses. Specifically, it is preferred that a protruding pattern of the mold is formed in conformity with the shape and pitch of preferred recesses as described above.

Specifically, a mold having a protruding pattern formed thereon is preferably pressed on the phosphor paste coating film at 0.1 to 100 MPa, and is more preferably pressed at 0.3 to 10 MPa. Moreover, by heating at 25 to 200° C. in pressing with the mold, recesses can be suitably formed on the coating film of the phosphor paste.

The scintillator panel preferably further has a barrier rib which divides the phosphor layer into a plurality of cells.

Figure 7:
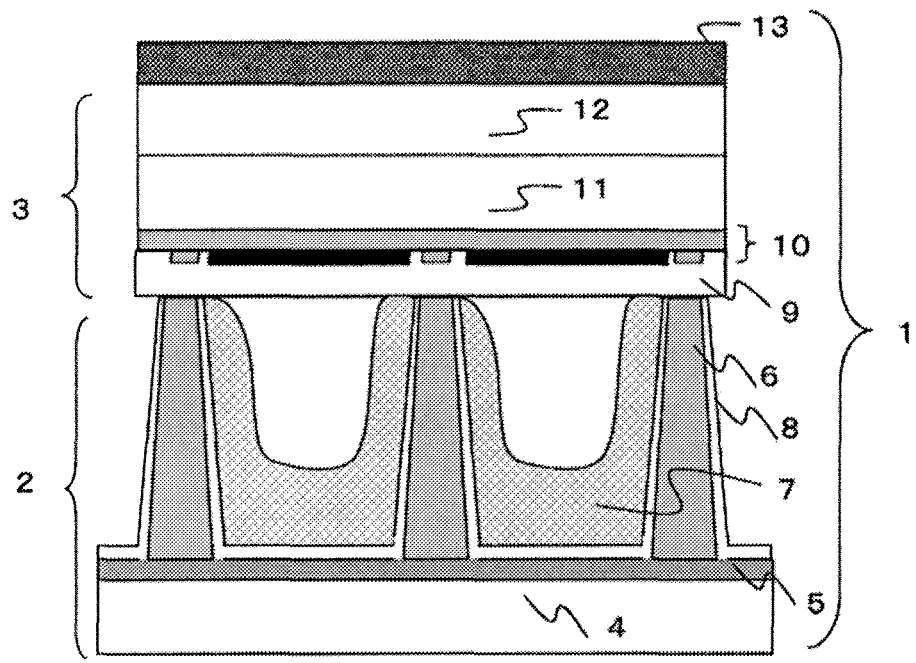
FIG. 7 shows a sectional view schematically showing a configuration of a radiographic image detection device including a scintillator panel having a barrier rib according to an aspect of the present invention.
Figure 8:
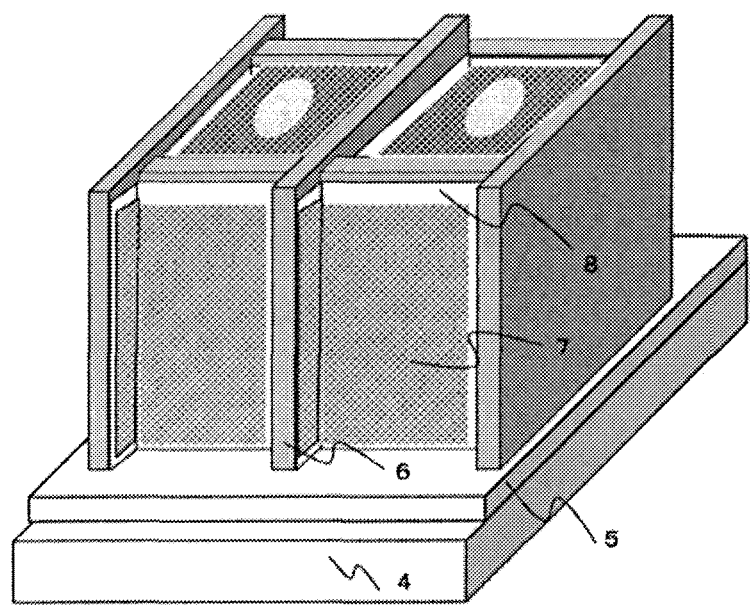
FIG. 8 shows a perspective view schematically showing a configuration of a scintillator panel having a barrier rib according to an aspect of the present invention.

FIG. 7 shows a sectional view schematically showing a configuration of a radiographic image detection device including a scintillator panel of an aspect in which it has a barrier rib. The scintillator panel 2 shown in FIG. 7 includes a substrate 4, a barrier rib 6 placed on the substrate 4, and a phosphor layer 7 divided into a plurality of cells by the barrier rib 6. Also in this aspect, the phosphor layer 7 has a plurality of recesses.

A buffer layer 5 is preferably formed between the substrate 4 and the barrier rib 6. By forming the buffer layer 5, it becomes possible to stably form the barrier rib 6. By increasing the reflectance of the buffer layer 5 to visible light, emitted light of the phosphor powder contained in the phosphor layer 7 can be made to reach a photoelectric conversion layer 10 on the detection substrate 3 with high efficiency.

Moreover, by forming a reflecting layer 8 having a high reflectance in each cell divided by the barrier rib 6, emitted light of the phosphor powder contained in the phosphor layer 7 can be made to reach the photoelectric conversion layer 10 on the detection substrate 3 with high efficiency.

The phosphor layer is divided by the barrier rib. Therefore, when photoelectric conversion elements in the photoelectric conversion layer 10 are arranged so as to bring the size and pitch of pixels of photoelectric conversion elements arranged in a grid-like shape in the detection substrate 3 into correspondence with the size and pitch of cells divided by a barrier rib of the scintillator panel 2, scattering of light emitted from a phosphor can be prevented from affecting a neighboring cell.

The height h of the barrier rib is preferably 120 to 1000 μm, and more preferably 160 to 500 μm. When the height h of the barrier rib is more than 1000 μm, formation of the barrier rib may become difficult. On the other hand, when the height h is less than 120 μm, the amount of a phosphor powder is reduced, and therefore there may be cases in which the emitted light having a necessary intensity is not obtained.

The shape of the barrier rib may be appropriately selected to match the shape of a pixel of a photoelectric conversion element of a detection substrate, and the barrier rib is preferably grid-like as shown in FIG. 8. Examples of the shape of the opening of the cell divided into a grid-like shape include shapes such as square, rectangle, parallelogram and trapezoid; however, the shape is preferably square since the intensity of emitted light is more uniform.

In the grid-like barrier rib, the pitch P' which is a distance between neighboring barrier ribs is preferably 50 to 1000 μm. When the pitch P' is less than 50 μm, formation of the barrier rib may become difficult. On the other hand, when the pitch P' is more than 1000 μm, there may be cases in which a clear image is not achieved.

Figure 9:
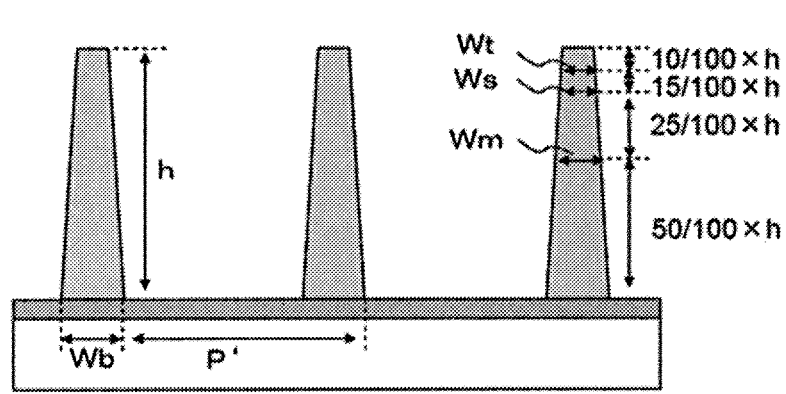
FIG. 9 shows a sectional view schematically showing a barrier rib, a buffer layer, and a substrate in a scintillator panel having a barrier rib according to an aspect of the present invention.

The bottom width Wb of the barrier rib is preferably 15 to 150 μm. A width Wm at a position which is 50% of the height of the barrier rib is preferably 15 to 120 pin. A width Ws at a position which is 75% of the height of the barrier rib and a top width Wt of the barrier rib are preferably each 80 μm or less. When the widths Wb and Wm are less than 15 μm, defects easily occur in the barrier rib. On the other hand, when the width Wb is more than 150 μm or the width Wm is more than 120 μm, the amount of a phosphor powder is reduced, and therefore there may be cases in which the emitted light having a necessary intensity is not achieved. When the widths Ws and Wt are each more than 80 μm, travel of the light emitted from a phosphor may be inhibited and the emitted light does not reach the photoelectric conversion layer, resulting in a reduction of utilization efficiency of the emitted light. Herein, the width Wb refers to a width of the barrier rib at a position where the barrier rib is in contact with a substrate or a buffer layer in a cross section obtained when the barrier rib is cut in the height direction thereof and so as to be perpendicular to the longitudinal direction thereof, as shown in FIG. 9. Herein, in the grid-like barrier rib, the barrier rib is cut at a position of half the pitch P'. Further, the width Wm refers to a width of the barrier rib at a position whose height is 50% of the height h of the barrier rib in the same cross section. The width Ws refers to a width of the barrier rib at a position whose height is 75% of the height h of the barrier rib in the same cross section. The width Wt refers to a width of the barrier rib at a position whose height is 90% of the height h of the barrier rib in the same cross section. The height h, the width Wb, the width Wm, the width Ws, and the width Wt can be determined by observing a cross section of the barrier rib with a SEM, measuring three or more locations of the cross section, and calculating average values of measured values. In addition, in order to make light emitted from a phosphor reach the photoelectric conversion layer efficiently, a cross section of the barrier rib preferably has a shape in which a width of the barrier rib decreases from the bottom toward the top of the barrier rib, that is, a tapered shape as shown in FIG. 7 and FIG. 9.

Examples of the material of the barrier rib include resins such as acrylic resins, polyester resins and epoxy resins, glass, and metals. The barrier rib is preferably mainly formed of glass from the viewpoint of productivity and mechanical strength. Herein, the phrase "mainly formed of glass" means that the rate of glass in the barrier rib is 60% by mass or more. The rate is more preferably 70% by mass or more.

Examples of a method of forming the barrier rib include an etching method, a screen printing method, a sandblasting method, a mold transfer method, and a photosensitive paste method. The photosensitive paste method is preferred in order to obtain a high-resolution barrier rib.

The photosensitive paste method refers to a method of forming a barrier rib including an application step of applying a photosensitive paste which contains a photosensitive organic component onto a substrate to form a photosensitive paste coating film; an exposure step of exposing the obtained photosensitive paste coating film to light through a photomask having a desired opening; and a development step of dissolving and removing a part of the exposed photosensitive paste coating film which is soluble in a developer.

Further, in the above-mentioned photosensitive paste method, it is preferred to add a low-melting-point glass powder to the photosensitive paste, and the method further includes a firing step of heating a photosensitive paste pattern after the development step at a high temperature to decompose/distil the organic component off, and soften and sinter the low-melting-point glass to form a barrier rib.

The heating temperature in the firing step is preferably 500 to 700° C., and more preferably 500 to 650° C. When the heating temperature is 500° C. or higher, the organic component is completely decomposed/distilled off, and the low-melting-point glass powder is softened and sintered. On the other hand, when the heating temperature is higher than 700° C., deformation of the substrate or the like may become intense.

The photosensitive paste preferably contains an organic component and an inorganic powder. The rate of the inorganic powder in the photosensitive paste is preferably 30 to 80% by mass, and more preferably 40 to 70% by mass. When the rate of the inorganic powder is less than 30% by mass, that is, the organic component is excessive, the shrinkage rate in the firing step increases, and therefore defects of the barrier rib easily occur. On the other hand, when the content of the inorganic powder is more than 80% by mass, that is, the content of the organic component is too low, not only the stability and coatability of the photosensitive paste are adversely affected, but also the dispersibility of the inorganic powder is deteriorated to easily cause defects of the barrier rib. The rate of the low-melting-point glass powder in the inorganic powder is preferably 50 to 100% by mass. When the rate of the low-melting-point glass powder is less than 50% by mass, sintering of the inorganic powder is insufficient, and therefore the strength of the barrier rib may be deteriorated.

The softening temperature of the low-melting-point glass powder is preferably 480° C. or higher. When the softening temperature is lower than 480° C., the organic component may remain in the glass without being decomposed/distilled off to cause coloring and the like. In consideration of the heating temperature in the firing step, the softening temperature of the low-melting-point glass is preferably 480 to 700° C., more preferably 480 to 640° C., and further preferably 480 to 620° C.

The softening temperature of the low-melting-point glass can be determined by extrapolating a heat absorption completion temperature at an endothermic peak by a tangent method from a DTA curve obtained by measuring a sample using a differential thermal analyzer (e.g., Differential Type Differential Thermal Balance TG8120; manufactured by RIGAKU CORPORATION). More specifically, a low-melting-point glass powder serving as a measurement sample is measured by elevating the temperature at 20° C./minute from room temperature using an alumina powder as a standard sample and using a differential thermal analyzer to give a DTA curve. A softening point Ts determined by extrapolating a heat absorption completion temperature at an endothermic peak by a tangent method from the obtained DTA curve can be regarded as the softening temperature of the low-melting-point glass.

The thermal expansion coefficient of the low-melting-point glass is preferably $40 \times 10^{-7}$ to $90 \times 10^{-7}$ (/K). When the thermal expansion coefficient is more than $90 \times 10^{-7}$ (/K), the scintillator panel to be obtained is significantly warped, and image clarity may be deteriorated due to crosstalk or the like of the emitted light. On the other hand, when the thermal expansion coefficient is less than $40 \times 10^{-7}$ (/K), there may be cases in which the softening temperature of the low-melting-point glass is not adequately reduced.

Examples of a component to be contained for lowering the melting point of glass include lead oxide, bismuth oxide, zinc oxide, and alkali metal oxides. It is preferred to adjust the softening temperature of the low-melting-point glass by the content of an alkali metal oxide selected from the group consisting of lithium oxide, sodium oxide, and potassium oxide.

The rate of an alkali metal oxide in the low-melting-point glass is preferably set to 2 to 20% by mass. When the rate of the alkali metal oxide is less than 2% by mass, the softening temperature of the low-melting-point glass is high, and therefore it is necessary to perform heating at a high temperature in the firing step, and consequently it is likely that the substrate is distorted or defects occur in the barrier rib. On the other hand, when the rate of the alkali metal oxide is more than 20% by mass, since the viscosity of the low-melting-point glass decreases too much in the firing step, the shape of the barrier rib obtained is easily distorted. Further, the porosity of the barrier rib obtained is excessively low, and emitted light having a necessary intensity is not attained in the scintillator panel obtained.

The low-melting-point glass preferably contains 3 to 10% by mass of zinc oxide besides the alkali metal oxide for adjusting the viscosity of the low-melting-point glass at a high temperature. When the rate of zinc oxide is less than 3% by mass, the viscosity of the low-melting-point glass at a high temperature is excessively high. On the other hand, when the rate of zinc oxide is more than 10% by mass, cost of the low-melting-point glass increases.

Furthermore, when the low-melting-point glass contains silicon oxide, boron oxide, aluminum oxide, an oxide of an alkaline-earth metal, and the like in addition to the alkali metal oxide and zinc oxide, the stability, crystallinity, transparency, refractive index, thermal expansion characteristic, and the like of the low-melting-point glass can be adjusted. As the oxide of an alkaline-earth metal, an oxide of a metal selected from the group consisting of magnesium, calcium, barium, and strontium is preferably contained.

An example of the preferred composition of the low-melting-point glass is shown below.
Alkali metal oxide: 2 to 20% by mass
Zinc oxide: 3 to 10% by mass
Silicon oxide: 20 to 40% by mass
Boron oxide: 25 to 40% by mass
Aluminum oxide: 10 to 30% by mass
Oxide of alkaline-earth metal: 5 to 15% by mass It is preferred that the average particle diameter D50 of the low-melting-point glass powder is 1.0 to 4.0 μm. When the average particle diameter D50 is less than 1.0 μm, the low-melting-point glass powder is agglomerated, resulting in deterioration of the dispersibility of particles, and this may adversely affect coatability of a paste. On the other hand, when the average particle diameter D50 is more than 4.0 μm, projections and depressions of a barrier rib surface increase, and this easily causes defects of the barrier rib.

The average particle diameter D50 of the inorganic powder including a low-melting-point glass powder can be measured after charging the inorganic powder into a sample chamber filled with water using a particle size distribution analyzer (e.g., MT 3300; manufactured by NIKKISO Co., Ltd.), and subjecting the powder to an ultrasonic treatment for 300 seconds.

In order to control the shrinkage rate in the firing step and maintain the shape of the barrier rib, the photosensitive paste preferably further contains a filler as an inorganic powder. Herein, the filler refers to an inorganic powder which does not soften even at 700° C. As the filler, high-melting-point glass or particles of ceramics such as silicon oxide, aluminum oxide, titanium oxide, or zirconium oxide are preferred. However, the rate of the filler in the inorganic powder is preferably less than 50% by mass so that sintering of the low-melting-point glass is not inhibited. Further, the average particle diameter D50 of the filler is preferably 0.1 to 4.0 μm.

Examples of the photosensitive organic component contained in the photosensitive paste include a photosensitive monomer, a photosensitive oligomer, a photosensitive polymer, and a photo-polymerization initiator. Herein, the photosensitive monomer, the photosensitive oligomer, and the photosensitive polymer respectively refer to a monomer, an oligomer, and a polymer, which have an active carbon-carbon double bond, and cause a reaction of photo-cross-linking, photopolymerization or the like by irradiation of active light rays to change their chemical structures.

Examples of the photosensitive monomer include compounds having a vinyl group, an acryloyl group, a methacryloyl group or an acrylamide group, and polyfunctional acrylate compounds and polyfunctional methacrylate compounds are preferred. The rate of the polyfunctional acrylate compound or the polyfunctional methacrylate compound in the organic component is preferably 10 to 80% by mass in order to increase the crosslinking density.

Examples of the photosensitive oligomer and the photosensitive polymer include copolymers having a carboxyl group, which is obtained by copolymerizing a carboxyl group-containing monomer such as acrylic acid, methacrylic acid, itaconic acid, crotonic acid, maleic acid, fumaric acid, vinylacetic acid, or an acid anhydride thereof, with a monomer such as a methacrylic acid ester, an acrylic acid ester, styrene, acrylonitrile, vinyl acetate, or 2-hydroxy acrylate. Examples of a method for introducing an active carbon-carbon double bond into an oligomer or a polymer include a method in which an ethylenically unsaturated compound having a glycidyl group or an isocyanate group, acrylic acid chloride, methacrylic acid chloride, or allyl chloride, or carboxylic acid such as maleic acid is reacted with a mercapto group, an amino group, a hydroxyl group, or a carboxyl group in an oligomer or a polymer.

In addition, by using a monomer or an oligomer having a urethane structure, stress relaxation occurs after the start of heating in the firing step, and therefore a photosensitive paste insusceptible to pattern defects can be obtained.

The photo-polymerization initiator refers to a compound which generates radicals when irradiated with active light rays. Examples of the photo-polymerization initiator include benzophenone, methyl o-benzoylbenzoate, 4,4-bis(dimethylamino)benzophenone, 4,4-bis(diethylamino)benzophenone, 4,4-dichlorobenzophenone, 4-benzoyl-4-methyl diphenyl ketone, dibenzyl ketone, fluorenone, 2,2-dimethoxy-2-phenyl acetophenone, 2-hydroxy-2-methylpropiophenone, thioxanthone, 2-methylthioxanthone, 2-chlorothioxanthone, 2-isopropylthioxanthone, diethylthioxanthone, benzil, benzyl methoxyethyl acetal, benzoin, benzoin methyl ether, benzoin isobutyl ether, anthraquinone, 2-tert-butylanthraquinone, anthrone, benzanthrone, dibenzosuberone, methylene anthrone, 4-azidobenzal acetophenone, 2,6-bis(p-azidobenzylidene) cyclohexanone, 2,6-bis(p-azidobenzylidene)-4-methylcyclohexanone, 1-phenyl-1,2-butanedione-2-(o-methoxycarbonyl)oxime, 1-phenyl-1,2-propanedione-2-(o-ethoxycarbonyl)oxime, 1,3-diphenylpropanetrione-2-(o-ethoxycarbonyl)oxime, 1-phenyl-3-ethoxypropanetrione-2-(o-benzoyl)oxime, Michler's ketone, 2-methyl-1-[4-(methylthio)phenyl]-2-morpholino-1-propanone, 2-benzyl-2-dimethylamino-1-(4-morpholinophenyl)butanone-1, naphthalenesulfonyl chloride, quinolinesulfonyl chloride, N-phenylthioacridone, benzothiazole disulfide, triphenylphosphine, benzoin peroxide, and combinations of a photoreducing dye such as eosin or methylene blue and a reducing agent such as ascorbic acid or triethanol amine.

When the photosensitive paste contains a copolymer having a carboxyl group, solubility of the photosensitive paste in an alkali aqueous solution is improved. The acid value of the copolymer having a carboxyl group is preferably 50 to 150 mg KOH/g. When the acid value is 150 mg KOH/g or less, the allowable range of development is widened. On the other hand, when the acid value is 50 mg KOH/g or more, the solubility of an unexposed part in a developer is not reduced, and therefore a barrier rib pattern with a narrow width can be obtained with use of a low concentration of a developer. It is preferred that the copolymer having a carboxyl group has an ethylenically unsaturated group on a side chain. Examples of the ethylenically unsaturated group include an acrylic group, a methacrylic group, a vinyl group, and an allyl group.

The average refractive index n1 of the low-melting-point glass powder and the average refractive index n2 of the photosensitive organic component, which are contained in the photosensitive paste, preferably satisfy a relationship of $-0.1 \leq (n1-n2) \leq 0.1$, more preferably $-0.01 \leq (n1-n2) \leq 0.01$, and further preferably $-0.005 \leq (n1-n2) \leq 0.005$. By satisfying such requirement, light scattering at the interface between the low-melting-point glass powder and the photosensitive organic component is suppressed in the exposure step, so that a higher-resolution pattern can be formed.

The average refractive index n1 of the low-melting-point glass powder can be measured using a Becke line detection method. More specifically, measurement of a refractive index at 25° C. and at a wavelength of 436 nm (g-ray) is repeated five times, and an average value of the five measurements may be taken as a refractive index n1. Further, the average refractive index n2 of the photosensitive organic component can be determined by measuring a coating film formed only of a photosensitive organic component by ellipsometry. More specifically, measurement of a refractive index of the coating film at 25° C. and at a wavelength of 436 nm (g-ray) is repeated five times, and an average value of the five measurements may be taken as a refractive index n2.

Examples of a method for producing the photosensitive paste include a method in which an organic solvent or the like is added to the inorganic powder and the photosensitive organic component as required, and the resulting mixture is homogeneously mixed and dispersed using a three-roll roller or a kneader.

The viscosity of the photosensitive paste can be appropriately adjusted by addition of, for example, an inorganic powder, a thickener, an organic solvent, a polymerization inhibitor, a plasticizer, or a precipitation preventive agent. The viscosity of the photosensitive paste is preferably 2 to 200 Pa·s. When the photosensitive paste is applied by a spin coating method, the viscosity of the photosensitive paste is preferably 2 to 5 Pa's, and when the photosensitive paste is applied one time by a screen printing method to give a coating film having a thickness of 10 to 40 μm, the viscosity is preferably 50 to 200 Pa's.

An example of a production method of a barrier rib using the photosensitive paste will be described below. The photosensitive paste is applied onto the whole or part of the surface of the substrate to form a photosensitive paste coating film. Examples of an application method include a spin coating method, a screen printing method, and a method using a bar coater, a roll coater, a die coater or a blade coater. The thickness of the photosensitive paste coating film can be appropriately adjusted, for example, by the number of times of application, the mesh of the screen, or the viscosity of the photosensitive paste.

Exposure of the formed photosensitive paste coating film is performed generally by a method of exposing the coating film through a photomask; however, a method of directly making a drawing by laser light and performing exposure may be employed. Examples of exposing light include a near infrared ray, a visible light ray and an ultraviolet ray, and the ultraviolet ray is preferred. Examples of a light source of the ultraviolet ray include a low-pressure mercury lamp, a high-pressure mercury lamp, an ultra-high pressure mercury lamp, a halogen lamp, and a germicidal lamp, and the ultra-high pressure mercury lamp is preferred. Examples of exposure conditions include exposure performed for 0.01 to 30 minutes using an ultra-high pressure mercury lamp with a power of 1 to 100 mW/cm$^2$.

Using a difference in solubility in a developer between an exposed part and an unexposed part in the photosensitive paste coating film after exposure, the unexposed part is dissolved/removed, and subsequently the coating film is washed with water (rinsed) and dried as required, and thereby a barrier rib pattern is obtained. Examples of a method of development include a dipping method, a spray method, a brush method, and an ultrasonic wave method, and when the barrier rib height h is more than 300 μm, the spray method and the ultrasonic wave method are preferred.

The ultrasonic wave method refers to a method of dissolving and removing the unexposed part by irradiation of ultrasonic waves. Since the developer erodes not only the unexposed part but also an inadequately cured semicured part of the exposed part to allow a dissolving reaction to proceed, a barrier rib pattern with a narrower width can be formed. In addition, the ultrasonic wave method may be applied to water washing (rinsing) after development.

The frequency of an ultrasonic wave in the ultrasonic wave method is preferably 20 to 50 kHz in order to make degrees of erosion of the unexposed part and the exposed part with a developer appropriate. The intensity (watt density) of the ultrasonic wave per unit area of the substrate is preferably 40 to 100 W/cm$^2$. The irradiation time of the ultrasonic wave is preferably 20 to 600 seconds, more preferably 30 to 500 seconds, and further preferably 60 to 300 seconds.

When the photosensitive paste contains a compound having an acidic group such as a copolymer having a carboxyl group, an alkali aqueous solution can be used as a developer. Examples of the alkali aqueous solution include aqueous solutions of inorganic alkalis such sodium hydroxide, sodium carbonate, and calcium hydroxide; and aqueous solutions of organic alkalis such as tetramethylammonium hydroxide, trimethylbenzylammonium hydroxide, monoethanolamine, and diethanolamine. The organic alkali aqueous solution is preferred because it is easily decomposed/distilled off in the firing step. The concentration of the organic alkali aqueous solution is preferably 0.05 to 5% by mass, and more preferably 0.1 to 1% by mass in order to make degrees of dissolution of the unexposed part and the exposed part appropriate. The development temperature is preferably 20 to 50° C. from the viewpoint of process control.

When the firing step is applied, the barrier rib pattern obtained in the above-mentioned manner is fired in a firing furnace in an atmosphere of air, nitrogen, hydrogen or the like. Examples of the firing furnace include a batch-type firing furnace and a belt-type continuous firing furnace.

When the barrier rib pattern containing the low-melting-point glass is fired, the inorganic powder particles containing the low-melting-point glass are softened and sintered to be fused together in the firing step, but voids remain between the fused inorganic powder particles. The rate of the voids included in the barrier rib can be adjusted by the heating temperature in the firing step. The rate of the voids in the whole barrier rib, that is, the porosity is preferably 2 to 25% by volume, more preferably 5 to 25% by volume, and further preferably 5 to 20% by volume in order to achieve effective reflection of light emitted from the phosphor and strength of the barrier rib simultaneously. When the porosity is less than 2%, the reflectance of the barrier rib may be low to reduce the amount of emitted light of a scintillator panel. On the other hand, when the porosity is more than 25%, strength of the barrier rib may be insufficient.

The porosity can be measured by precisely polishing a cross section of a barrier rib, and then observing the cross section with an electron microscope. More specifically, a part of the voids and the other part derived from the inorganic powder are converted into images in a two-gray scale, and the rate of the area of the voids in the area of the barrier rib cross section can be considered as the porosity.

A buffer layer is preferably formed between the barrier rib and the substrate in order to relax stress in the firing step. As the material of the buffer layer, the low-melting-point glass or ceramics is preferred in order to increase the reflectance of the buffer layer. Examples of the material of the low-melting-point glass include the same materials as those contained in the photosensitive paste for forming a barrier rib. Examples of the ceramics include titanium oxide, aluminum oxide, and zirconium oxide. In addition, in order to avoid the light emitted from a phosphor from transmitting through the buffer layer, the reflectance of the buffer layer to light having a wavelength of 550 nm is preferably 60% or more.

The buffer layer can be formed by applying a paste formed by dispersing an organic component and an inorganic powder such as a low-melting-point glass powder or a ceramic powder in a solvent to a substrate, drying the paste to form a coating film, and firing the coating film. The firing temperature is preferably 500 to 700° C., and more preferably 500 to 650° C.

The scintillator panel preferably includes a reflecting layer having a recessed shape between the phosphor layer and the barrier rib. Herein, the recessed shape refers to a shape in which an upper surface of the reflecting layer in each cell, that is, a surface positioned opposite to the substrate is recessed to a substrate side. By forming a reflecting layer having a recessed shape in each cell divided by a barrier rib, the light emitted from a phosphor can be reflected to reduce leakage of the emitted light to a barrier rib side.

As the material of the reflecting layer, a material allowing transmittance of a radiation and reflecting visible light having a wavelength of 300 to 800 nm, which is the light emitted from the phosphor, can be used. As the material, metals such as silver, gold, aluminum, nickel, and titanium; and ceramics such as titanium oxide, zirconium oxide, aluminum oxide, and zinc oxide are preferred since such materials are hardly degraded.

The thickness of the reflecting layer having a recessed shape is preferably 0.01 to 50 μm, and more preferably 0.1 to 20 μm. When the thickness of the reflecting layer is 0.01 μm or more, the reflectance of the layer is high. On the other hand, when the thickness of the reflecting layer is more than 50 μm, the emitted light is weak since the amount of the phosphor powder is small.

The thickness of the reflecting layer having a recessed shape can be determined by measuring, in a cross section obtained by cutting the barrier rib in the height direction thereof and so as to be perpendicular to the longitudinal direction thereof, the thickness of a cross section of the reflecting layer at three or more locations with a SEM, and calculating the average value of measured values. Herein, in the grid-like barrier rib, the barrier rib is cut at a position of half the pitch P'.

Examples of a method of forming a reflecting film include a vacuum film forming method, a plating method, a paste application method, and jetting with a spray.

Specific examples of the paste application method include a method in which a reflecting layer paste containing a powder of white ceramics such as titanium oxide, zirconium oxide, aluminum oxide, and zinc oxide, a binder resin such as an ethyl cellulose resin and a polyvinyl butyral resin, and an organic solvent, is filled into cells divided by the barrier rib and dried.

When the scintillator panel has a barrier rib, the phosphor paste is applied onto the barrier rib and the phosphor paste is filled into cells divided by the barrier rib.

Examples of a method of filling a phosphor paste into each cell include a screen printing method, a bar coater method, a roll coater method, a die coater method, and a blade coater method. When the phosphor paste is filled under vacuum, or when the phosphor paste is left standing for a certain time under vacuum after being filled, the occurrence of voids in the phosphor layer, which causes defects of images, can be suppressed.

In this aspect, examples of a method of forming recesses in the surface of the phosphor layer include a method in which the phosphor paste is filled into cells, and then the phosphor paste is dried. In this case, the recess of the phosphor layer can be formed into any shape by controlling the viscosity of the phosphor paste, the solid content rate of the phosphor paste, or conditions of drying. In this case, the viscosity of the phosphor paste is preferably 10 to 500 Pa's. Further, the solid content rate of the phosphor paste refers to the rate of a component, in the whole phosphor paste, which is not distilled off in drying. The solid content rate of the phosphor paste is preferably 5 to 95% by volume. In addition, examples of a method of drying the phosphor paste include hot-air drying and IR drying.

Figure 10:
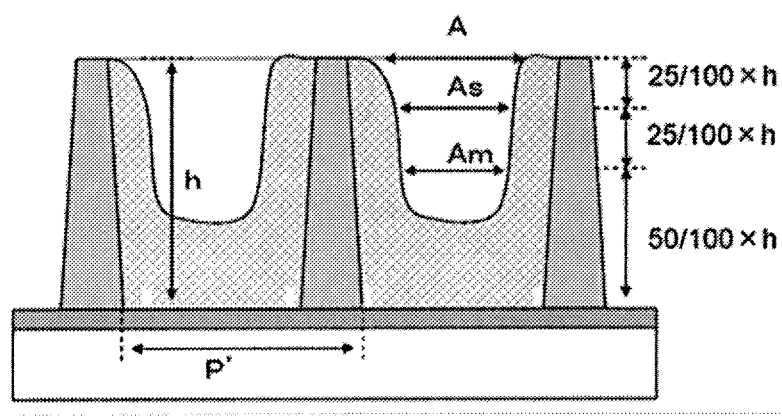
FIG. 10 shows a sectional view schematically showing a configuration of a scintillator panel having a barrier rib according to an aspect of the present invention.

A sectional view schematically showing such a scintillator panel according to an aspect is shown in FIG. 10. The area A of openings of the recesses of the phosphor layer can be determined in the manner described above. Further, the area of the opening at a position whose height is 50% of the height h of the barrier rib is denoted by Am, and the area of the opening at a position whose height is 75% of the height h of the barrier rib is denoted by As. The Am and the As can be measured in the same manner as in the opening area A.

Examples of another method of forming recesses in the coating film of the phosphor paste include a method in which the phosphor paste is filled into cells, and then the surface of the paste is pressed with a protruding object.

In addition, when the scintillator panel has a barrier rib, a recess may be formed in each cell, or a plurality of recesses may be formed in each cell.

It is preferred that the phosphor layer is composed of a plurality of layers having different filling densities of the phosphor powder regardless of whether it has a barrier rib or not. A layer having the highest filling density of the phosphor powder, that is, a high-filling-density phosphor layer has a high reflectance. The high-filling-density phosphor layer is preferably positioned on a substrate side when the direction of irradiation of a radiation is on a substrate side. Further, by forming the high-filling-density phosphor layer having a recessed shape in each cell divided by a barrier rib, the light emitted from a phosphor can be reflected to reduce leakage of the emitted light to a barrier rib side. The filling density of the phosphor layer can be calculated from the mass per unit volume of a phosphor paste coating film which is formed by applying a phosphor paste so as to be 300 μm in thickness of the dried coating film and drying the paste in an IR drying furnace at 100° C. for 2 hours under ordinary pressure. The filling density of the high-filling-density phosphor layer is preferably 3.0 g/cm$^3$ or more, and more preferably 4.0 g/cm$^3$ or more.

The scintillator panel and the detection substrate thus obtained are disposed so that the phosphor layer, having the recesses, of the scintillator panel is opposed to the photoelectric conversion element disposed in the detection substrate, and these parts undergo an alignment step of aligning the recesses with the photoelectric conversion element and a bonding step of bonding the scintillator panel to the detection substrate with the adhesion layer interposed therebetween. In this way, a radiographic image detection device can be prepared.

A method of aligning the scintillator panel 2 provided with recesses with the detection substrate 3 provided with photoelectric conversion elements is not particularly limited, and it is preferred to align these so that brightness is the highest and moire is not generated in the image.

An example of a step of aligning a scintillator panel 2 of an aspect not having a barrier rib with a detection substrate 3 will be described. On a scintillator panel 2 side, a recess different in shape from a recess disposed in the pixel part is formed as an alignment mark at each of four corners of the surface of the phosphor layer. Herein, the shape of the alignment mark is not particularly limited; however, when the shape of the recess is approximately conical, for example, a cross shape is preferred. On a detection substrate 3 side, an alignment mark corresponding to that on the scintillator panel 2 side is formed. By aligning the alignment mark of the scintillator panel 2 with the alignment mark of the detection substrate 3, the recesses in the phosphor layer surface can be aligned with the position of the photoelectric conversion element. The alignment mark is preferably formed in a region outer than the detection region of the photoelectric conversion layer.

An example of a step of aligning the scintillator panel 2 of an aspect having a barrier rib with the detection substrate 3 provided with photoelectric conversion elements will be described. On a scintillator panel 2 side, an auxiliary barrier rib different in shape or size from the barrier rib is formed as an alignment mark at each of four corners of a region where the barrier rib is formed. Herein, the shape of the auxiliary barrier rib is not particularly limited, and the shape is preferably elliptic when the shape of the barrier rib is grid-like. On a detection substrate 3 side, an alignment mark corresponding to that on the scintillator panel 2 side is formed. By aligning the auxiliary barrier rib of the scintillator panel 2 with the alignment mark of the detection substrate 3, the recesses in the phosphor layer surface can be aligned with the position of the photoelectric conversion element. The auxiliary barrier rib is preferably formed in a region outer than the detection region of the photoelectric conversion layer.

After the alignment step, the scintillator panel is bonded to the detection substrate with the adhesion layer interposed therebetween to give a radiographic image detection device. A pressure-sensitive adhesive sheet is bonded to the detection substrate, or a pressure-sensitive agent is applied to the detection substrate to form an adhesion layer. The thickness of the adhesion layer is preferably in the range of 0.5 to 30 μm. When the thickness of the adhesion layer is less than 0.5 μm, it is not preferred since an adhesive power is low. On the other hand, when the thickness of the adhesion layer is more than 30 μm, image clarity is reduced since light is diffused when the light emitted from the phosphor layer transmits the adhesion layer.

Since the light emitted from the phosphor layer is detected at the photoelectric conversion element after transmitting the adhesion layer, the material of the adhesion layer is preferably low in light absorption at a wavelength of light emission of the phosphor. A specific example of the adhesion layer is not particularly limited, and examples thereof include a pressure-sensitive adhesive sheet obtained by applying an acrylic resin to both surfaces of a transparent polyester film.

EXAMPLES

The present invention will be described in more detail below by way of examples and comparative examples; however, the present invention is not limited thereto.

(Preparation of Photosensitive Paste for Barrier Rib)

To 38 parts by mass of an organic solvent, 24 parts by mass of a photosensitive polymer, 6 parts by mass of a photosensitive monomer x, 4 parts by mass of a photosensitive monomer y, 6 parts by mass of a photo-polymerization initiator, 0.2 parts by mass of a polymerization inhibitor, and 12.8 parts by mass of an ultraviolet ray absorber solution were added, and the resulting mixture was heated/dissolved at a temperature of 80° C. The resulting solution was cooled, and then 9 parts by mass of a viscosity adjustment agent was added to the solution to give an organic solution for a barrier rib.

The specific materials used for the photosensitive paste are as follows.

Photosensitive polymer: a product of an addition reaction of 0.4 equivalents of glycidyl methacrylate to carboxyl groups of a copolymer composed of methacrylic acid/methyl methacrylate/styrene in a mass ratio of 40:40:30 (weight average molecular weight: 43000, acid value: 100)

Photosensitive monomer x: trimethylolpropane triacrylate

Photosensitive monomer y: tetrapropylene glycol dimethacrylate

Photo-polymerization initiator: 2-benzyl-2-dimethylamino-1-(4-morpholinophenyl)butanone-1 (IC369; manufactured by BASF Corporation)

Polymerization inhibitor: 1,6-hexanediol-bis[(3,5-di-t-butyl-4-hydroxyphenyl)propionate])

Ultraviolet ray absorber solution: 0.3% by mass γ-butyrolactone solution (Sudan IV; manufactured by TOKYO OHKA KOGYO Co., Ltd.)

Organic solvent: γ-butyrolactone

Viscosity adjustment agent: Flownon (registered trademark) EC121 (manufactured by KYOEISHA CHEMICAL CO., LTD.)

To 60 parts by mass of the organic solution for a barrier rib thus obtained were added 30 parts by mass of a low-melting-point glass powder and 10 parts by mass of a high-melting-point glass powder, followed by kneading the resulting mixture with a three-roll kneader to prepare a photosensitive paste for a barrier rib.

The specific composition is as follows.

Low-melting-point glass powder: 27% by mass of $SiO_2$, 31% by mass of $B_2O_3$, 6% by mass of ZnO, 7% by mass of $Li_2O$, 2% by mass of MgO, 2% by mass of CaO, 2% by mass of BaO, 23% by mass of $Al_2O_3$; softening temperature 588° C.; thermal expansion coefficient $68 \times 10^{-7}$ (/K); average particle diameter (D50) 2.3 μm High-melting-point glass powder: 30% by mass of $SiO_2$, 31% by mass of $B_2O_3$, 6% by mass of ZnO, 2% by mass of MgO, 2% by mass of CaO, 2% by mass of BaO, 27% by mass of $Al_2O_3$; softening temperature 790° C.; thermal expansion coefficient $32 \times 10^7$ (/K); average particle diameter (D50) 2.3 μm (Preparation of Paste for Buffer Layer)

To 95 parts by mass of the photosensitive paste for a barrier rib was added 5 parts by mass of a titanium oxide powder (average particle diameter (D50) 0.3 μm), and the resulting mixture was kneaded to prepare a paste for a buffer layer.

(Preparation of Reflecting Layer Paste A)

To an organic solution obtained by dissolving 5 parts by mass of an organic binder (ethyl cellulose (100 cP)) in 80 parts by mass of an organic solvent (terpineol) under heating at a temperature of 80° C., 15 parts by mass of rutile-type titanium oxide (average particle diameter (D50) 0.25 μm) was added, and the resulting mixture was kneaded to prepare a reflecting layer paste A.

(Preparation of Reflecting Layer Paste B)

To an organic solution obtained by dissolving 5 parts by mass of an organic binder (ethyl cellulose (100 cP)) in 60 parts by mass of an organic solvent (terpineol) under heating at a temperature of 80° C., 35 parts by mass of rutile-type titanium oxide (average particle diameter (D50) 0.25 μm) was added, and the resulting mixture was kneaded to prepare a reflecting layer paste B.

(Preparation of Reflecting Layer Paste C)

To an organic solution obtained by dissolving 5 parts by mass of an organic binder (ethyl cellulose (14 cP)) in 80 parts by mass of an organic solvent (terpineol) under heating at a temperature of 80° C., 15 parts by mass of rutile-type titanium oxide (average particle diameter (D50) 0.25 μm) was added, and the resulting mixture was kneaded to prepare a reflecting layer paste C.

(Preparation of Phosphor Paste A)

In 70 parts by mass of an organic solvent (terpineol, specific gravity 0.93 g/cm$^3$), 30 parts by mass of an organic binder (ethyl cellulose (7 cp); specific gravity 1.1 g/cm$^3$) was dissolved under heating at a temperature of 80° C. to give an organic solution 1. Further, as a phosphor powder, Tb-activated gadolinium oxysulfide ($Gd_2O_2S$: Tb, specific gravity 7.3 g/cm$^3$) having an average particle diameter (D50) of 10 μm was prepared.

In 15 parts by mass of the organic solution 1, 85 parts by mass of a phosphor powder was mixed to give a phosphor paste A. The filling density of a phosphor layer formed using the phosphor paste A was 4.0 g/cm$^3$.

(Preparation of Phosphor Pastes B to H)

Organic solutions 2 to 6 each having the composition shown in Table 1 were prepared by the same method as in preparation of the organic solution 1. Then, phosphor pastes B to H each having the composition shown in Table 2 were prepared by the same method as in preparation of the phosphor paste A.

TABLE 1

| | | Composition of Organic Solvent for Phosphor | | | | | |
|---|---|---|---|---|---|---|---|
| | | Organic Solvent 1 | Organic Solvent 2 | Organic Solvent 3 | Organic Solvent 4 | Organic Solvent 5 | Organic Solvent 6 |
| Organic Binder (parts by mass) | Ethyl Cellulose (7 cP) | 30 | — | — | — | — | 10 |
| | Ethyl Cellulose (14 cP) | — | 20 | — | — | — | — |
| | Ethyl Cellulose (100 cP) | — | — | 10 | — | 5 | — |
| | Ethyl Cellulose (200 cP) | — | — | — | 8 | — | — |
| Organic solvent (parts by mass) | Terpineol | 70 | 80 | 90 | 92 | 95 | 90 |

TABLE 2

| | Composition of Phosphor Paste (parts by mass) | | | | | | | |
|---|---|---|---|---|---|---|---|---|
| | A | B | C | D | E | F | G | H |
| Organic Solvent 1 | 15 | — | — | — | — | — | — | 15 |
| Organic Solvent 2 | — | 20 | — | — | — | — | — | — |
| Organic Solvent 3 | — | — | 20 | — | — | — | 15 | — |
| Organic Solvent 4 | — | — | — | 20 | — | — | — | — |
| Organic Solvent 5 | — | — | — | — | 20 | — | — | — |
| Organic Solvent 6 | — | — | — | — | — | 30 | — | — |
| $Gd_2O_2S$: Tb D50 2 μm | — | — | — | — | — | — | 85 | — |
| $Gd_2O_2S$: Tb D50 10 μm | 85 | 80 | 80 | 80 | 80 | — | — | 85 |
| $Gd_2O_2S$: Tb D50 20 μm | — | — | — | — | — | 70 | — | — |
| Filling Density of Phosphor Film (g/cm³) | 4.0 | 4.2 | 4.8 | 4.9 | 5.0 | 4.1 | 5.1 | 4.3 |

Comparative Example 1

The phosphor paste A was applied onto a white PET film substrate (E6SQ; manufactured by TORAY INDUSTRIES, INC.) having a size of 100 mm×100 mm with a die coater so as to be 300 μm in thickness of the dried coating film, and then dried in an IR drying furnace at 100° C. for 2 hours to form a phosphor paste coating film, that is, a solid-coated phosphor layer to give a scintillator panel. Parameters of the obtained scintillator panel are shown in Table 3.

The obtained scintillator panel was set in an FPD (PaxScan3030; manufactured by Varian Medical Systems, Inc.) serving as a detection substrate to prepare a radiographic image detection device. The scintillator panel was irradiated from the substrate side thereof with radiations at a tube voltage of 80 kVp, and the intensity of light emission of the scintillator panel was detected by PaxScan3030. Consequently, sufficient intensity of light emission was attained.

Hereinafter, this value of the intensity of light emission of Comparative Example 1 was taken as 100, and each scintillator panel was relatively evaluated. Further, the scintillator panel was irradiated from the substrate side thereof with radiations at a tube voltage of 80 kVp through an MTF chart made of lead, and the resulting image data was processed to calculate an MTF which is a measure of image clarity. Hereinafter, this value of the MTF of Comparative Example 1 was taken as an image clarity of 100, and each scintillator panel was relatively evaluated.

Example 1

The phosphor paste A was applied onto a white PET film substrate (E6SQ; manufactured by TORAY INDUSTRIES, INC.) having a size of 100 mm×100 mm with a die coater so as to be 300 μm in thickness of the dried coating film, and then dried in an IR drying furnace at 100° C. for 2 hours to form a phosphor paste coating film, that is, a solid-coated phosphor layer.

A shaping die made of alumina (thermal expansion coefficient $71 \times 10^{-7}$ (/K)) was prepared. In the shaping die, a plurality of protruding patterns (having an approximately conical shape with a radius of 50 μm and a height of 270 μm) are formed in the form of a two-dimensional matrix with both the longitudinal and transverse pitches of 194 μm, and a cross-shaped pattern with a line width of 50 μm is formed at each of four corners of the plurality of protruding patterns. The shaping die was pressed against the phosphor layer formed in the above-mentioned manner at 80° C. to form recesses in the surface of the phosphor layer, and thereby a scintillator panel including a phosphor layer having a plurality of recesses in a surface thereof was obtained. Parameters of the obtained scintillator panel are shown in Table 3.

The obtained scintillator panel was set in an FPD (PaxScan3030) with the recess aligned with an alignment mark of the FPD to prepare a radiographic image detection device. The scintillator panel was irradiated from the substrate side thereof with radiations at a tube voltage of 80 kVp, and the intensity of light emission of the scintillator panel was detected by PaxScan3030. Consequently, an intensity of light emission as high as 102 was attained relative to 100 being the intensity of light emission in Comparative Example 1. Further, the scintillator panel was irradiated from the substrate side thereof with radiations at a tube voltage of 80 kVp through an MTF chart made of lead, and the resulting image data was processed to calculate an MTF. Consequently, the MTF exhibited a value as high as 105 relative to 100 being the image clarity in Comparative Example 1.

Example 2

A scintillator panel was prepared by the same method as in Example 1 except that the height of the protruding pattern was changed to 240 Lm, and evaluated in the same manner as in Example 1. Parameters and evaluation results of the obtained scintillator panel are shown in Table 3. The same applies to Examples 3 to 19 and Comparative Examples 2 to 4 below.

Example 3

A scintillator panel was prepared by the same method as in Example 1 except that the height of the protruding pattern was changed to 200 μm, and evaluated in the same manner as in Example 1.

Example 4

A scintillator panel was prepared by the same method as in Example 1 except that the height of the protruding pattern was changed to 150 μm, and evaluated in the same manner as in Example 1.

Example 5

A scintillator panel was prepared by the same method as in Example 1 except that the height of the protruding pattern was changed to 100 μm, and evaluated in the same manner as in Example 1.

Example 6

A scintillator panel was prepared by the same method as in Example 1 except that the height of the protruding pattern was changed to 40 μm, and evaluated in the same manner as in Example 1.

Example 7

A scintillator panel was prepared by the same method as in Example 4 except that the radius of the protruding pattern was changed to 15 μm, and evaluated in the same manner as in Example 1.

Example 8

A scintillator panel was prepared by the same method as in Example 4 except that the radius of the protruding pattern was changed to 30 μm, and evaluated in the same manner as in Example 1.

Example 9

A scintillator panel was prepared by the same method as in Example 4 except that the radius of the protruding pattern was changed to 70 μm, and evaluated in the same manner as in Example 1.

Example 10

A scintillator panel was prepared by the same method as in Example 4 except that the radius of the protruding pattern was changed to 90 μm, and evaluated in the same manner as in Example 1.

Example 11

A scintillator panel was prepared by the same method as in Example 8 except that both the longitudinal and transverse pitches of the protruding pattern were changed to 127 μm.
The obtained scintillator panel was set in an FPD (PaxScan2520; manufactured by Varian Medical Systems, Inc.) to prepare a radiographic image detection device, and evaluated in the same manner as in Example 1.

Example 12

A scintillator panel was prepared by the same method as in Example 8 except that both the longitudinal and transverse pitches of the protruding pattern were changed to 83 μm.
The obtained scintillator panel was set in an FPD (PaxScan3024; manufactured by Varian Medical Systems, Inc.) to prepare a radiographic image detection device, and evaluated in the same manner as in Example 1.

Example 13

A scintillator panel was prepared by the same method as in Example 7 except that the thickness of the phosphor paste coating film was changed to 500 μm, both the longitudinal and transverse pitches of the protruding pattern were changed to 42 μm, and the height of the protruding pattern was changed to 200 μm, and the scintillator panel was evaluated in the same manner as in Example 12.

Example 14

A scintillator panel was prepared by the same method as in Example 9 except that both the longitudinal and transverse pitches of the protruding pattern were changed to 582 μm and the height of the protruding pattern was changed to 100 μm, and the scintillator panel was evaluated in the same manner as in Example 1. In addition, in the resulting image, periodic noises were found.

Example 15

A scintillator panel was prepared by the same method as in Example 1 except that the thickness of the phosphor paste coating film was changed to 150 μm, and the radius and the height of the protruding pattern were changed to 30 μm and 30 μm, respectively, and the scintillator panel was evaluated in the same manner as in Example 1.

Example 16

A scintillator panel was prepared by the same method as in Example 1 except that the thickness of the phosphor paste coating film was changed to 500 μm, and the radius and the height of the protruding pattern were changed to 50 μm and 200 μm, respectively, and the scintillator panel was evaluated in the same manner as in Example 1.

Example 17

A scintillator panel was prepared by the same method as in Example 1 except that the shape of the protruding pattern was changed to the form of cylinders having a radius of 50 μm and a height of 150 μm which were formed at a pitch of 194 μm in both the longitudinal and transverse directions, and the scintillator panel was evaluated in the same manner as in Example 1.

Example 18

A scintillator panel was prepared by the same method as in Example 1 except that the shape of the protruding pattern was changed to the form of square prisms having a length of a side of 100 μm and a height of 150 μm which were formed at a pitch of 194 μm in both the longitudinal and transverse directions, and the scintillator panel was evaluated in the same manner as in Example 1.

Example 19

A scintillator panel was prepared by the same method as in Example 1 except that the shape of the protruding pattern was changed to the form of regular quadrangular pyramids having a length of a side of 100 μm and a height of 150 μm which were formed at a pitch of 194 μm in both the longitudinal and transverse directions, and the scintillator panel was evaluated in the same manner as in Example 1.

Example 20

The phosphor paste G was solid-printed throughout the surface using a screen printer (manufactured by MICROTEK Inc.; a screen plate #350 POL mesh) so as to be 50 μm in thickness of the dried coating film, and dried in an IR drying furnace at 100° C. for 1 hour, and then the phosphor paste A was applied so that the total thickness of the phosphor paste coating film would be 230 μm, and dried in an IR drying furnace at 100° C. for 1 hour to form a phosphor paste coating film having a multilayer structure composed of layers different in filling density.

Recesses were formed in the surface of the coating film by the same method as in Example 5 to give a scintillator panel including a phosphor layer having a plurality of recesses in a surface thereof, and the scintillator panel was evaluated in the same manner as in Example 1.

Example 21

The phosphor paste G was applied with a die coater so as to be 50 μm in thickness of the dried coating film, and then the phosphor paste A was applied so that the total thickness of the phosphor paste coating film would be 230 μm, and dried in an IR drying furnace at 100° C. for 1 hour to form a phosphor paste coating film having a multilayer structure composed of layers different in filling density.

Recesses were formed in the surface of the coating film by the same method as in Example 6 to give a scintillator panel including a phosphor layer having a plurality of recesses in a surface thereof, and the scintillator panel was evaluated in the same manner as in Example 1.

Example 22

The phosphor paste G was applied with a die coater so as to be 50 μm in thickness of the dried coating film, and then the phosphor paste A was applied so that the total thickness of the phosphor paste coating film would be 150 μm, and dried in an IR drying furnace at 100° C. for 1 hour to form a phosphor paste coating film having a multilayer structure composed of layers different in filling density.

Recesses were formed in the surface of the coating film by the same method as in Example 15 to give a scintillator panel including a phosphor layer having a plurality of recesses in a surface thereof, and the scintillator panel was evaluated in the same manner as in Example 1.

Example 23

The phosphor paste G was applied with a die coater so as to be 50 μm in thickness of the dried coating film, and then the phosphor paste A was applied so that the total thickness of the phosphor paste coating film would be 330 μm, and dried in an IR drying furnace at 100° C. for 2 hours to form a phosphor paste coating film having a multilayer structure composed of layers different in filling density.

Recesses were formed in the surface of the coating film by the same method as in Example 5 to give a scintillator panel including a phosphor layer having a plurality of recesses in a surface thereof, and the scintillator panel was evaluated in the same manner as in Example 1.

Comparative Example 2

A scintillator panel was prepared by the same method as in Example 1 except that the height and the radius of the protruding pattern were changed to 280 μm and 70 μm, respectively, and the scintillator panel was evaluated in the same manner as in Example 1.

Comparative Example 3

A scintillator panel was prepared by the same method as in Example 4 except that the radius of the protruding pattern was changed to 10 μm, and evaluated in the same manner as in Example 1.

Comparative Example 4

A scintillator panel was prepared by the same method as in Example 4 except that the radius of the protruding pattern was changed to 160 μm, and evaluated in the same manner as in Example 1. In addition, in the resulting image, periodic noises were found.

TABLE 3

| | Phosphor Layer | | | | | | Panel Characteristics | |
| | | | | | | | Light Emission | |
| | Phosphor Thickness T (μm) | D/T | Opening Pitch of Recesses (μm$^2$) | Opening Area A of Recesses (μm$^2$) | Maximum Width W of Openings of Recesses (μm) | Number of Recesses (recesses/cm$^2$) | Intensity (relative to Comparative Example 1) | Image Clarity (relative to Comparative Example 1) |
|---|---|---|---|---|---|---|---|---|
| Example 1 | 300 | 0.90 | 194 | 7854 | 100 | 2657 | 102 | 105 |
| Example 2 | 300 | 0.80 | 194 | 7854 | 100 | 2657 | 105 | 112 |
| Example 3 | 300 | 0.67 | 194 | 7854 | 100 | 2657 | 111 | 112 |
| Example 4 | 300 | 0.50 | 194 | 7854 | 100 | 2657 | 112 | 108 |
| Example 5 | 300 | 0.33 | 194 | 7854 | 100 | 2657 | 108 | 106 |
| Example 6 | 300 | 0.13 | 194 | 7854 | 100 | 2657 | 101 | 101 |
| Example 7 | 300 | 0.50 | 194 | 707 | 30 | 2657 | 103 | 104 |
| Example 8 | 300 | 0.50 | 194 | 2827 | 60 | 2657 | 114 | 107 |
| Example 9 | 300 | 0.50 | 194 | 15394 | 140 | 2657 | 108 | 110 |
| Example 10 | 300 | 0.50 | 194 | 25447 | 180 | 2657 | 103 | 105 |
| Example 11 | 300 | 0.50 | 127 | 2827 | 60 | 6200 | 108 | 107 |
| Example 12 | 300 | 0.50 | 83 | 2827 | 60 | 14516 | 103 | 117 |
| Example 13 | 500 | 0.60 | 42 | 707 | 30 | 58064 | 103 | 102 |
| Example 14 | 300 | 0.33 | 582 | 15394 | 140 | 295 | 104 | 101 |
| Example 15 | 150 | 0.20 | 194 | 2827 | 60 | 2657 | 101 | 126 |
| Example 16 | 500 | 0.40 | 194 | 7854 | 100 | 2657 | 113 | 102 |
| Example 17 | 300 | 0.50 | 194 | 7854 | 100 | 2657 | 110 | 109 |
| Example 18 | 300 | 0.50 | 194 | 10000 | 141 | 2657 | 108 | 110 |
| Example 19 | 300 | 0.50 | 194 | 10000 | 141 | 2657 | 111 | 108 |
| Comparative Example 1 | 300 | 0.00 | — | — | — | — | 100 | 100 |

TABLE 3-continued

| | Phosphor Layer | | | | | Panel Characteristics | |
| --- | --- | --- | --- | --- | --- | --- | --- |
| | | | | | | Light Emission | |
| | Phosphor Thickness T (μm) | D/T | Opening Pitch of Recesses (μm²) | Opening Area A of Recesses (μm²) | Maximum Width W of Openings of Recesses (μm) | Number of Recesses (recesses/cm²) | Intensity (relative to Comparative Example 1) | Image Clarity (relative to Comparative Example 1) |
| Comparative Example 2 | 300 | 0.93 | 194 | 25447 | 180 | 2657 | 85 | 99 |
| Comparative Example 3 | 300 | 0.50 | 194 | 314 | 20 | 2657 | 95 | 100 |
| Comparative Example 4 | 300 | 0.50 | 388 | 80425 | 320 | 664 | 93 | — |
| Example 20 | 230 | 0.43 | 194 | 7854 | 100 | 2657 | 106 | 123 |
| Example 21 | 230 | 0.17 | 194 | 7854 | 100 | 2657 | 100 | 114 |
| Example 22 | 150 | 0.20 | 194 | 2827 | 60 | 2657 | 100 | 128 |
| Example 23 | 330 | 0.30 | 194 | 7854 | 100 | 2657 | 112 | 106 |

Comparative Example 5

A photosensitive paste was applied onto a glass substrate (soda glass; thermal expansion coefficient $90 \times 10^{-7}$ (/K), substrate thickness 0.7 mm) having a size of 100 mm×100 mm with a die coater so as to be 450 μm in thickness of the dried coating film, and dried in an IR drying furnace at 100° C. for 4 hours to form a photosensitive paste coating film. The formed photosensitive paste coating film was exposed at an exposure amount of 500 mJ/cm² with an ultra-high pressure mercury lamp through a photomask having an opening corresponding to a desired barrier rib pattern (chrome mask having grid-like openings with both the longitudinal and transverse pitches of 194 μm and a line width of 20 μm). The exposed photosensitive paste coating film was developed by showering at a pressure of 1.5 kg/cm² for 420 seconds using a 0.5% by mass aqueous ethanolamine solution at 35° C. as a developer, and the photosensitive paste coating film was further irradiated with ultrasonic waves of 40 kHz and 100 W/cm² for 240 seconds while being impregnated with the developer, washed by water-showering at a pressure of 1.5 kg/cm², and dried at 120° C. for 10 minutes to form a grid-like photosensitive paste pattern. The formed photosensitive paste pattern was fired at 585° C. for 15 minutes in air to form a grid-like barrier rib having a cross section shape as shown in Table 4.

The phosphor paste A was solid-printed repeatedly on the formed barrier rib throughout the surface using a screen printer (manufactured by MICROTEK Inc.; a phosphor squeegee used; a screen plate #200 SUS mesh), subjected to vacuum treatment in a desiccator, and subjected to heating treatment for 60 minutes in an IR dryer at 60° C., and then the phosphor paste having overflowed the barrier rib was scraped off using a rubber squeegee. Thereafter, the phosphor paste was dried in a hot-air drying oven at 100° C. for 40 minutes to form a phosphor layer as shown in Table 5 to give a scintillator panel.

The obtained scintillator panel was set in an FPD (PaxScan3030; manufactured by Varian Medical Systems, Inc.) to prepare a radiographic image detection device. The scintillator panel was irradiated from the substrate side thereof with radiations at a tube voltage of 80 kVp, and the intensity of light emission of the scintillator panel 40B was detected by PaxScan3030. Consequently, sufficient images were obtained (hereinafter, this value of the intensity of light emission was taken as 100, and each scintillator panel was relatively evaluated). Further, the scintillator panel was irradiated from the substrate side thereof with radiations at a tube voltage of 80 kVp through an MTF chart made of lead, and the resulting image data was processed to calculate an MTF (hereinafter, this value of the MTF was taken as an image clarity of 100, and each scintillator panel was relatively evaluated).

Example 24

A photosensitive paste was applied onto a glass substrate (soda glass; thermal expansion coefficient $90 \times 10^{-7}$ (/K), substrate thickness 0.7 mm) having a size of 100 mm×100 mm with a die coater so as to be 450 μm in thickness of the dried coating film, and dried in an IR drying furnace at 100° C. for 4 hours to form a photosensitive paste coating film. The formed photosensitive paste coating film was exposed at an exposure amount of 500 mJ/cm² with an ultra-high pressure mercury lamp through a photomask having an opening corresponding to a desired barrier rib pattern (chrome mask having grid-like openings with both the longitudinal and transverse pitches of 194 μm and a line width of 20 μm). The exposed photosensitive paste coating film was developed by showering at a pressure of 1.5 kg/cm² for 420 seconds using a 0.5% by mass aqueous ethanolamine solution at 35° C. as a developer, and the photosensitive paste coating film was further irradiated with ultrasonic waves of 40 kHz and 100 W/cm² for 240 seconds while being impregnated with the developer, washed by water-showering at a pressure of 1.5 kg/cm², and dried at 120° C. for 10 minutes to form a grid-like photosensitive paste pattern. The formed grid-like photosensitive paste pattern was fired at 585° C. for 15 minutes in air to form a grid-like barrier rib having a cross section shape as shown in Table 4.

The phosphor paste A was solid-printed repeatedly on the formed barrier rib throughout the surface using a screen printer (manufactured by MICROTEK Inc.; a phosphor squeegee used; a screen plate #200 SUS mesh) and subjected to vacuum treatment in a desiccator, and then the phosphor paste having overflowed the barrier rib was scraped off using a rubber squeegee. Thereafter, the phosphor paste was dried in a hot-air drying oven at 100° C. for 40 minutes to form a phosphor layer having recesses with a circular opening as shown in Table 5 to give a scintillator panel.

The obtained scintillator panel was set in an FPD (PaxScan3030; manufactured by Varian Medical Systems, Inc.) to prepare a radiographic image detection device. The scintillator panel was irradiated from the substrate side thereof with radiations at a tube voltage of 80 kVp, and the intensity of light emission of the scintillator panel 24B was detected by PaxScan3030. Consequently, an intensity of light emission as high as 103 was attained relative to 100 being the intensity of light emission in Comparative Example 5. Further, the scintillator panel was irradiated from the substrate side thereof with radiations at a tube voltage of 80 kVp through an MTF chart made of lead, and the resulting image data was processed to calculate an MTF. Consequently, the MTF exhibited a value as high as 101 relative to 100 being the image clarity in Comparative Example 5.

Example 25

A scintillator panel was prepared by the same method as in Example 24 except that the phosphor paste B was used, and the temperature of the hot-air drying oven was set to 120° C., and the scintillator panel was evaluated in the same manner as in Example 24. Parameters and evaluation results of the obtained scintillator panel are shown in Table 4 and Table 5. The same applies to Examples 26 to 40 and Comparative Example 6 below.

Example 26

A scintillator panel was prepared by the same method as in Example 24 except that the phosphor paste C was used, and the temperature of the hot-air drying oven was set to 120° C., and the scintillator panel was evaluated in the same manner as in Example 24.

Example 27

A scintillator panel was prepared by the same method as in Example 24 except that the phosphor paste D was used, and the temperature of the hot-air drying oven was set to 140° C., and the scintillator panel was evaluated in the same manner as in Example 24.

Example 28

A scintillator panel was prepared by the same method as in Example 24 except that the phosphor paste C was used, and the temperature of the hot-air drying oven was set to 200° C., and the scintillator panel was evaluated in the same manner as in Example 24.

Example 29

A scintillator panel was prepared by the same method as in Example 24 except that the phosphor paste C was used, and the temperature of the hot-air drying oven was set to 160° C., and the scintillator panel was evaluated in the same manner as in Example 24.

Example 30

A scintillator panel was prepared by the same method as in Example 24 except that the phosphor paste C was used, and the temperature of the hot-air drying oven was set to 90° C. to dry the paste C for 80 minutes, and the scintillator panel was evaluated in the same manner as in Example 24.

Example 31

A grid-like barrier rib was formed on a glass substrate having a size of 100 mm×100 mm by the same method as in Example 24. The reflecting layer paste C was solid-printed repeatedly several times on the formed barrier rib throughout the surface using a screen printer (manufactured by MICROTEK Inc.; a phosphor squeegee used; a screen plate #200 SUS mesh) to fill cells divided by the barrier rib with the reflecting layer paste C. Thereafter, the reflecting layer paste was subjected to vacuum treatment in a desiccator, and then the reflecting layer paste having overflowed the cell was scraped off using a rubber squeegee. Thereafter, the reflecting layer paste was dried in an IR drying furnace at 40° C. for 120 minutes to form a reflecting layer having a thickness of 10 μm on a bottom face in each cell divided by the barrier rib.

Thereafter, a phosphor layer was formed by the same method as in Example 24 to give a scintillator panel, and the scintillator panel was evaluated in the same manner as in Example 24.

Example 32

A grid-like barrier rib was formed on a glass substrate having a size of 100 mm×100 mm by the same method as in Example 24. The reflecting layer paste A was solid-printed repeatedly several times on the formed barrier rib throughout the surface using a screen printer (a phosphor squeegee used; a screen plate #200 SUS mesh) to fill cells divided by the barrier rib with the reflecting layer paste A. Thereafter, the reflecting layer paste was subjected to vacuum treatment in a desiccator, and then the reflecting layer paste having overflowed the cell was scraped off using a rubber squeegee. Thereafter, the reflecting layer paste was dried in a hot-air drying oven at 160° C. for 60 minutes to form a reflecting layer having a thickness of 10 μm and a recessed shape on the whole surface within each cell divided by the barrier rib.

Thereafter, a phosphor layer was formed by the same method as in Example 24 to give a scintillator panel, and the scintillator panel was evaluated in the same manner as in Example 24.

Example 33

A scintillator panel was prepared by the same method as in Example 32 except that the reflecting layer paste B was used, and the thickness of the reflecting layer was changed to 30 μm, and the scintillator panel was evaluated in the same manner as in Example 24.

Example 34

A scintillator panel was prepared by the same method as in Example 32 except that the phosphor paste C was used, and the temperature of the hot-air drying oven was set to 120° C., and the scintillator panel was evaluated in the same manner as in Example 24.

Example 35

A scintillator panel was prepared by the same method as in Example 32 except that the phosphor paste D was used, and the temperature of the hot-air drying oven was set to 140° C., and the scintillator panel was evaluated in the same manner as in Example 24.

Example 36

A photosensitive paste coating film was formed on a glass substrate having a size of 100 mm×100 mm by the same method as in Example 24. The formed photosensitive paste coating film was exposed by the same method as in Example 24 except that the photomask was changed to a chrome mask having grid-like openings with both the longitudinal and transverse pitches of 127 µm and a line width of 15 µm, and the exposure amount was changed to 350 mJ/cm². The exposed photosensitive paste coating film was developed by showering at a pressure of 1.5 kg/cm² for 500 seconds using a 0.5% by mass aqueous ethanolamine solution at 35° C. as a developer, and the photosensitive paste coating film was further irradiated with ultrasonic waves of 40 kHz and 100 W/cm² for 400 seconds while being impregnated with the developer, washed by water-showering at a pressure of 1.5 kg/cm², and a grid-like barrier rib was formed by the same method as in Example 24.

Thereafter, a reflecting layer was prepared by the same method as in Example 32, and a phosphor layer was formed by the same method as in Example 26 except that the phosphor paste E was used, and the temperature of the hot-air drying oven was set to 140° C. to give a scintillator panel.

The obtained scintillator panel was set in an FPD (PaxScan2520; manufactured by Varian Medical Systems, Inc.) to prepare a radiographic image detection device, and evaluated in the same manner as in Example 24.

Example 37

The phosphor paste F was further solid-printed throughout the surface of a scintillator panel prepared by the same method as in Example 35 using a screen printer (a phosphor squeegee used; a screen plate #165 SUS mesh), subjected to vacuum treatment in a desiccator, and then dried in a hot-air drying oven at 100° C. for 40 minutes to form a second phosphor layer as shown in Table 5. Thus, a scintillator panel in which the phosphor layer was composed of a plurality of layers having different filling densities of the phosphor powder was obtained, and the scintillator panel was evaluated in the same manner as in Example 24.

Example 38

A scintillator panel was prepared by the same method as in Example 35 except that the phosphor paste G was used, and evaluated in the same manner as in Example 24.

Example 39

The phosphor paste H was further solid-printed throughout the surface of a scintillator panel prepared by the same method as in Example 38 using a screen printer (a phosphor squeegee used; a screen plate #165 SUS mesh), subjected to vacuum treatment in a desiccator, and then dried in a hot-air drying oven at 80° C. for 40 minutes to form a second phosphor layer as shown in Table 5. Thus, a scintillator panel in which the phosphor layer was composed of a plurality of layers having different filling densities of the phosphor powder was obtained, and the scintillator panel was evaluated in the same manner as in Example 24.

Example 40

The above-mentioned paste for a buffer layer was applied onto a glass substrate (soda glass; thermal expansion coefficient $90 \times 10^{-7}$ (/K), substrate thickness 0.7 mm) having a size of 100 mm×100 mm with a 15 µm bar coater and dried, and then the whole surface of the applied paste was irradiated with light of 500 mJ/cm² with an ultra-high pressure mercury lamp to form a coating film of a paste for a buffer layer having a thickness of 12 µm.

Next, a photosensitive paste pattern was formed on the coating film of a paste for a buffer layer in the same manner as in Example 24. By firing, at 585° C. for 15 minutes in air, the glass substrate thus obtained on which the photosensitive paste pattern is formed, firing of the coating film of a paste for a buffer layer and the photosensitive paste pattern was performed to form a glass substrate having the buffer layer and the grid-like barrier rib having a cross section shape as shown in Table 4.

Subsequently, a scintillator panel was prepared by the same method as in Example 32, and evaluated in the same manner as in Example 24.

Comparative Example 6

A grid-like barrier rib was formed on a glass substrate having a size of 100 mm×100 mm by the same method as in Example 24.

Thereafter, a phosphor layer was formed by the same method as in Example 24 except that the phosphor paste F was used to give a scintillator panel, and the scintillator panel was evaluated in the same manner as in Example 24.

TABLE 4

| | Barrier Rib Structure | | | | | |
| --- | --- | --- | --- | --- | --- | --- |
| | Pitch of Barrier Rib P (µm) | Height of Barrier Rib h (µm) | Bottom Width of Barrier Rib Wb (µm) | Width at Position of 50% of Height of Barrier Rib Wm (µm) | Width at Position of 75% of Height of Barrier Rib Ws (µm) | Top Width of Barrier Rib Wt (µm) |
| Example 24 | 193 | 300 | 35 | 30 | 27 | 25 |
| Example 25 | 193 | 300 | 35 | 30 | 27 | 25 |
| Example 26 | 193 | 300 | 35 | 30 | 27 | 25 |
| Example 27 | 193 | 300 | 35 | 30 | 27 | 25 |
| Example 28 | 193 | 300 | 35 | 30 | 27 | 25 |
| Example 29 | 193 | 300 | 35 | 30 | 27 | 25 |
| Example 30 | 193 | 300 | 35 | 30 | 27 | 25 |
| Example 31 | 193 | 300 | 35 | 30 | 27 | 25 |
| Example 32 | 193 | 300 | 35 | 30 | 27 | 25 |
| Example 33 | 193 | 300 | 35 | 30 | 27 | 25 |
| Example 34 | 193 | 300 | 35 | 30 | 27 | 25 |
| Example 35 | 193 | 300 | 35 | 30 | 27 | 25 |
| Example 36 | 127 | 300 | 32 | 28 | 22 | 21 |
| Example 37 | 193 | 300 | 35 | 30 | 27 | 25 |
| Example 38 | 193 | 300 | 35 | 30 | 27 | 25 |

TABLE 4-continued

| | Barrier Rib Structure | | | | | |
|---|---|---|---|---|---|---|
| | Pitch of Barrier Rib P (μm) | Height of Barrier Rib h (μm) | Bottom Width of Barrier Rib Wb (μm) | Width at Position of 50% of Height of Barrier Rib Wm (μm) | Width at Position of 75% of Height of Barrier Rib Ws (μm) | Top Width of Barrier Rib Wt (μm) |
| Example 39 | 193 | 300 | 35 | 30 | 27 | 25 |
| Example 40 | 193 | 300 | 35 | 30 | 27 | 25 |
| Comparative Example 5 | 193 | 300 | 35 | 30 | 27 | 25 |
| Comparative Example 6 | 193 | 300 | 35 | 30 | 27 | 25 |

TABLE 5

| | Phosphor layer | | | | | | | | Panel Characteristics | |
|---|---|---|---|---|---|---|---|---|---|---|
| | Phosphor Thickness T (μm) | D/T | Opening Pitch P of Recesses (μm) | Opening Area A of Recesses (μm$^2$) | Maximum Width W of Openings of Recesses (μm) | Number of Recesses (recesses/cm$^2$) | Opening Area As of Recesses at 75% of Height of Barrier Rib (μm$^2$) | Opening Area Am of Recesses at 50% of Height of Barrier Rib (μm$^2$) | Light Emission Intensity (relative to Comparative Example 5) | Image Clarity (relative to Comparative Example 5) |
| Example 24 | 300 | 0.17 | 193 | 7854 | 100 | 2685 | — | — | 103 | 101 |
| Example 25 | 300 | 0.33 | 193 | 7854 | 100 | 2685 | 2827 | — | 108 | 108 |
| Example 26 | 300 | 0.50 | 193 | 7854 | 100 | 2685 | 5027 | — | 112 | 112 |
| Example 27 | 300 | 0.70 | 193 | 7854 | 100 | 2685 | 6362 | 1963 | 109 | 114 |
| Example 28 | 300 | 0.70 | 193 | 1257 | 40 | 2685 | 1018 | 616 | 102 | 104 |
| Example 29 | 300 | 0.53 | 193 | 5027 | 80 | 2685 | 3848 | 962 | 106 | 107 |
| Example 30 | 300 | 0.45 | 193 | 11310 | 120 | 2685 | 3848 | — | 107 | 108 |
| Example 31 | 290 | 0.17 | 193 | 7854 | 100 | 2685 | — | — | 105 | 101 |
| Example 32 | 290 | 0.17 | 193 | 7854 | 100 | 2685 | — | — | 110 | 120 |
| Example 33 | 270 | 0.19 | 193 | 7854 | 100 | 2685 | — | — | 105 | 121 |
| Example 34 | 290 | 0.48 | 193 | 5027 | 80 | 2685 | 2463 | — | 121 | 131 |
| Example 35 | 290 | 0.69 | 193 | 5027 | 80 | 2685 | 3217 | — | 118 | 136 |
| Example 36 | 285 | 0.39 | 127 | 2827 | 60 | 6200 | 1257 | 79 | 105 | 128 |
| Example 37 | 290 | 0.48 | 193 | 2827 | 60 | 2685 | 804 | 314 | 124 | 129 |
| Example 38 | 290 | 0.59 | 193 | 7854 | 100 | 2685 | 5542 | 314 | 108 | 139 |
| Example 39 | 290 | 0.38 | 193 | 2827 | 60 | 2685 | 1257 | — | 118 | 138 |
| Example 40 | 290 | 0.17 | 193 | 7854 | 100 | 2685 | — | — | 112 | 120 |
| Comparative Example 5 | 300 | 0.00 | — | — | — | — | — | — | 100 | 100 |
| Comparative Example 6 | 300 | 0.92 | 193 | 7854 | 100 | 2685 | 5542 | 2827 | 95 | 114 |

DESCRIPTION OF REFERENCE SIGNS

1: Radiographic image detection device
2: Scintillator panel
3: Detection substrate
4: Substrate
5: Buffer layer
6: Barrier rib
7: Phosphor layer
8: Reflecting layer
9: Adhesion layer
10: Photoelectric conversion layer
11: Output layer
12: Substrate
13: Power source part

The invention claimed is:

1. A scintillator panel comprising a substrate and a phosphor layer containing a phosphor powder,
wherein the phosphor layer has a plurality of recesses in a surface thereof,
an area A of openings of the recesses is 500 to 70000 μm$^2$, and
a ratio D/T of a depth D of the recesses to a thickness T of the phosphor layer is 0.1 to 0.9,
wherein the phosphor layer has 500 to 50000 recesses/cm$^2$ on the surface thereof.

2. The scintillator panel according to claim 1,
wherein a pitch P between the recesses adjacent to each other is a constant value in the range of 50 to 350 μm, and
a maximum width W of the openings of the recesses is 30 to 300 μm.

3. The scintillator panel according to claim 1, further comprising a barrier rib which divides the phosphor layer.

4. The scintillator panel according to claim 3, further comprising a reflecting layer having a recessed shape between the phosphor layer and the barrier rib.

5. The scintillator panel according to claim 1, wherein the phosphor layer is composed of a plurality of layers having different filling densities of the phosphor powder.

6. A radiographic image detection device comprising the scintillator panel according to claim 1.

7. A method for manufacturing a radiographic image detection device comprising the scintillator panel according to claim 1 and a detection substrate including a photoelectric conversion element opposed to the recesses of the scintillator panel, the method comprising:
  (A) a step of aligning the recesses with the photoelectric conversion element; and
  (B) a step of bonding the scintillator panel to the detection substrate.

* * * * *